(12) United States Patent
Volkovs

(10) Patent No.: US 8,611,533 B2
(45) Date of Patent: Dec. 17, 2013

(54) METHOD AND SYSTEM FOR THE ORANGE FAMILY OF STREAM CIPHERS AND METHOD AND SYSTEM FOR GENERATING STREAM CIPHERS BASED ON THE ERINDALE-PLUS HASHING FUNCTION

(76) Inventor: Nikolajs Volkovs, Toronto (CA)

( * ) Notice: Subject to any disclaimer, the term of this patent is extended or adjusted under 35 U.S.C. 154(b) by 2 days.

(21) Appl. No.: 13/471,321

(22) Filed: May 14, 2012

(65) Prior Publication Data

US 2012/0284504 A1     Nov. 8, 2012

Related U.S. Application Data

(63) Continuation-in-part of application No. 13/057,030, filed on May 2, 2011, now Pat. No. 8,542,832.

(51) Int. Cl.
*H04K 1/04*     (2006.01)
*H04K 1/00*     (2006.01)
*H04L 9/00*     (2006.01)

(52) U.S. Cl.
USPC .............. 380/255; 380/37; 380/263; 380/268

(58) Field of Classification Search
USPC ............................ 380/225, 37, 255, 263, 268
See application file for complete search history.

(56) References Cited

U.S. PATENT DOCUMENTS

| | | | |
|---|---|---|---|
| 7,003,107 B2 * | 2/2006 | Ananth | 380/37 |
| 2005/0213752 A1 * | 9/2005 | Hawkes et al. | 380/28 |
| 2007/0291934 A1 * | 12/2007 | Volkovs et al. | 380/28 |

* cited by examiner

*Primary Examiner* — Mohammad W Reza
(74) *Attorney, Agent, or Firm* — David L. Romero; Law Office of David L. Romero

(57) ABSTRACT

The present invention introduces the Orange family of stream ciphers. The cipher may involve several elements including splitting with jumping, iterated transformations and padding. The construction of the cipher also involves constantly updated bit strings that may be used as multiple keystreams in transformations of various degrees. The cipher permits parameterizing speed, security and consumed memory. A customization of the cipher allows generating practically unlimited number of stream ciphers with different inner structures and IV parameters. The present invention also presents a transformation of the ERINDALE-PLUS hashing function. The transformed ERINDALE-PLUS hashing is capable simultaneously generate a ciphertext and a secure hash value of a message.

19 Claims, No Drawings

METHOD AND SYSTEM FOR THE ORANGE FAMILY OF STREAM CIPHERS AND METHOD AND SYSTEM FOR GENERATING STREAM CIPHERS BASED ON THE ERINDALE-PLUS HASHING FUNCTION

CROSS-REFERENCE TO RELATED APPLICATION

This application is a continuation-in-part of U.S. Non-Provisional patent application Ser. No. 13/057,030 filed on May 2, 2011 which claims benefits of the filing date and the contents of which is incorporated herein by reference.

FIELD OF INVENTION

The present invention is related generally to data communication in various networks. Specifically, the present invention relates to system and methods for constructing stream ciphers.

BACKGROUND OF INVENTION

Ciphers are used for encryption and decryption. Stream ciphers are cryptographic algorithms that are based on processing individual plaintext digits. Stream ciphers use transformations for generating ciphertext that are time-varying.

Ideologically stream ciphers are based on Shannon's result related to special class of ciphers that usually are referred to as Vernon's ciphers. A Vernon cipher is a cipher where the size of a key is of the size of a message and an encryption procedure is based on xor-ing bits of a message and the corresponding bits of a key. In other words, if $m_1 m_2 \ldots m_s$ is a binary representation of a message and $k_1 k_2 \ldots k_s$ is a binary representation of a key, then the binary representation of a ciphertext $c_1 c_2 \ldots c_s$ is computed by $$c_i = m_i \oplus k_i,$$

where $i=1, \ldots, s$. Shannon proved that if a sequence of bits $k_1 k_2 \ldots k_s$ is completely random and independent on a message, then a ciphertext $c_1 c_2 \ldots c_s$ cannot be broken.

Thus, the biggest problem of any stream cipher scheme is to construct a mechanism for generating a keystream of a required size, (that is, the size of a message) based on a key of relatively small size and a message itself.

There are a lot of stream ciphers that differ from each other by a method of realization of the keystream generators. One of the main approaches for constructing a keystream generator is based on various feedback shift registers (FSR). There are linear (LFSR) and non-linear feedback shift registers. The keystream generators that are based on LFSR and non-linear FSR are quite fast and convenient for crypto analysis.

Practically all keystream generators may be presented by a finite state machine. It is a well known fact that any finite state machine at certain time repeats its internal states. This means that all generated keystreams have a period, that is, in any keystream it is possible to find repeated substreams. Presence of repeated parts of a keystream allows applying various cryptographic attacks on a cipher. The larger period of a keystream the more secure is a cipher where the keystream is applied. One of the main ways of increasing the period of a keystream is to combine the outputs of a few keystream generators into a resulting keystream. For instance, the keystreams generated by a few linear FSR can be combined into one keystream using a Boolean function. However this may lead to applying the correlation attack on stream ciphers. The correlation attack analyzes and "catches" correlation between outputs of one "weak" keystream generator, for example, with short period and an output of the final block that combines keystreams from the individual generators into one keystream. The correlation attack on non-linear generators was developed by Siegenthaler. Meier and Siegenthaler presented fast correlation attacks that are more efficient than the attack proposed by Siegenthaler.

Thus, there is a need in building new constructions of stream ciphers, where, firstly, new methods of generating the keystreams are applied and, secondly, any analysis of influence of any keystream on the final output becoming difficult for an adversary.

SUMMARY OF INVENTION

In one aspect the invention is a system directed at stream ciphers capable of encrypting messages based on a key, characterized in that it comprised: at least one computer; a message sent by a sender by way of the at least one computer; a stream cipher system being operable by the at least one computer for application to the message, a key and a collection of initial values to produce a ciphertext, utilizing the following elements: a splitting with jumping procedure, an iterated transformation procedure, a bit strings generation procedure, a padding procedure; a stream cipher system being operable by the at least one computer for application to a ciphertext and a key to produce a plaintext.

In one more aspect the invention is a computer implemented method of a polynomial based stream cipher applied to a key and a message sent by a user from a computer, characterized in that it comprises the following steps: calculating a ciphertext utilizing the stream cipher comprises the following steps: applying to a key and the message a splitting with jumping procedure chosen from the group consisting of: splitting with jumping I and splitting with jumping II to generate splitting with jumping outputs, applying an iterated transformation procedure to the splitting with jumping outputs to generate transformation outputs of various degrees and a ciphertext, said iterated transformation procedure chosen from the group consisting of iterated transformation procedure without filters, iterated transformations procedure with filters I, iterated transformations procedure with filters II, iterated transformations procedure with filters III, iterated transformation procedure with filters with switchers I, iterated transformations procedure with filters with switchers II, applying a bit strings generation procedure to the splitting with jumping outputs and outputs of the transformations of various degrees to generate bit strings outputs, said bit strings generation procedure chosen from the group consisting of forming bit strings procedure I and forming bit strings procedure II, generating padding output by applying a padding procedure to the bit strings outputs, processing the padding outputs to complete generation of a ciphertext by applying the splitting procedure with jumping, iterated transformation procedure and the bit strings generation procedure, a stream cipher system being operable by the at least one computer for application to a key and a ciphertext to produce a plaintext.

In yet another aspect the invention is a computer system characterized in that it comprises software to program existing computer hardware to receiving a message sent by a sender, applying a stream cipher to a key and the message to produce a ciphertext output utilizing the following elements: a splitting with jumping procedure, an iterated transformation procedure and a padding procedure; said iterated transformation procedure chosen from the group consisting of iterated transformation without filters, iterated transformation with filters and iterated transformation with filters with switchers, a bit string generation procedure, a padding procedure; processing a key and the ciphertext by processing functions operable to generate a plaintext. In still another aspect the invention includes a modification of the main procedures of the polynomial-based ERINDALE-PLUS hashing function; said modified ERINDALE-PLUS hashing function is capable generating both a ciphertext and a secure hash value of a message.

In this respect, before explaining at least one embodiment of the invention in detail, it is to be understood that the invention is not limited in its application to the details of construction and to the arrangements of the components set forth in the following embodiments. The invention is capable of other embodiments and of being practiced and carried out in various ways. Also, it is to be understood that the phraseology and terminology employed herein are for the purpose of description and should not be regarded as limiting.

DETAILED DESCRIPTION OF THE PREFERRED EMBODIMENT

The present invention is a family of stream ciphers involving an Orange stream cipher. The construction of the cipher can involve a few steps including splitting with jumping, iterated transformation, forming bit strings and padding procedures which generally involves representing an initial sequence of bits as a specially constructed stream of n-bit words and also as polynomials of a degree less than n, where $4 \leq n \leq 10$. The methodology of building the presented cipher combines both—block and stream constructions.

The iterated transformation procedure of a degree greater than 1 is applied to the stream of polynomials generated by the splitting with jumping procedure and a new stream of transformed polynomials (n-bit words) of a degree less than n is formed. The iterated transformation allows modifying the whole stream of polynomials that are generated by the splitting with jumping procedure, and the modification may be realized many times, so that each time new streams of polynomials are formed. Iterative transformation of data is exactly the feature, which outlines the property that is natural to any block-based algorithm. On the other hand, the iterated transformation modifies the whole stream of the polynomials, not just a part (a block) of it, which makes it different from a block based construction.

The present invention involves a method of using constantly updated bit strings as keystream generators and a method of applying the keystreams (that is, the bit strings) in transformations of various degrees. Furthermore, the present intention proposes various schemes of applying the bit strings as keystreams—Orange cipher with filters and Orange cipher with filters with switchers. The iterated transformation provides multiple modification of the initial stream of polynomials generated by a splitting with jumping procedure based on a key and a message.

The iterated transformation consists of the transformations of various degrees, each of which provides the modification of the stream of polynomials (n-bit words) generated by a transformation of a lower degree. The transformations are fast and very convenient for parallelization. A number of bit strings may be "attached" to each transformation of the iterated transformation. The bit strings reflect a "time pattern" of the generated polynomials within a stream. Embedding the bit streams (keystreams) into transformations of various degrees in a framework of a cipher with filters and a cipher with filters with switchers provides additional "disturbance" in generated streams of polynomials and creates additional obstacle in analyzing the streams in order to break a cipher. As a number of keystreams and a degree of iterated transformation may be parameterized and may be increased up to any desired level practically without reducing the speed of the cipher, this leads to increasing security of the Orange cipher without reducing its speed.

A methodology of varying speed, security and consumed memory of the presented cipher, which was named the parameterization of the cipher, is presented.

A paradigm of generating a lot of stream ciphers with different inner structure, which was named the customization of the hash function, is further presented.

The present invention may provide a few benefits over the prior art, that is any FSR based cipher. Firstly, the present invention is a new method of constructing a cipher that combines both—the block and the stream paradigms. Secondly, the keystreams, a number of which is parameterized, are not combined in one final keystream (as it takes place in a prior art stream ciphers), but applied to the transformations that generate streams of polynomials of various degrees. In turn, this leads to additional modification of the generated streams of polynomials and the keystreams. Thirdly, the present invention (Orange cipher with filters with switchers) provides a construction that allows changing in time the influence of the keystreams to transformations of different degrees, so that during certain period of time a keystream is applied to a transformation of one degree, during another period of time a keystream is applied to a transformation of different degree and so forth. As the number of the keystreams (bit strings) is parameterized and action of each keystream may be changed in time, this leads to additional increasing the difficulty to analyze (to trace the modification of various streams of polynomials) and break a ciphertext.

In an embodiment of the present invention a method of modification of the ERINDALE-PLUS polynomial based hashing algorithm disclosed in U.S. Non-Provisional patent application Ser. No. 13/057,030 is presented. In particular, this modification involves transformation of procedures of splitting with jumping, masking, bit string generation and padding. The modifications have multiple effects. Firstly, they may provide increasing security of the ERINDALE-PLUS hashing function as the involvement of bit strings in the computation of elements of transformations of various degrees making analysis and attack of the hashing function more complicated. Secondly, the modifications allow (with the use of a key) generating simultaneously a ciphertext and a secure hash value of a processed message. Moreover, the generation of a ciphertext during the process of computing a secure hash value of a message does not reduce the speed and does not require using additional memory. Additionally, the modifications increase the possibilities of the parameterization and customization of the ERINDALE-PLUS hashing functions.

Dedicated hardware elements, including a field-programmable gate array (FPGA), custom Application Specific Integrated Circuits (ASIC) and digital signal processors (DSP), can be used in the implementation of the present invention. A general purpose computer can also be programmed to execute the methods of the present invention.

Embodiments of the present invention may include various constructions of the stream cipher. These are detailed below. However, a skilled reader will recognize that embodiments of the present invention may include variations of the constructions.

I. The Orange Family of Stream Ciphers without Filters

In an embodiment of the present invention a family of stream ciphers involving an Orange stream cipher is presented. The construction of the presented family of ciphers does not use any keystream and consists of a few steps.

A. Splitting with Jumping

In an embodiment of the present invention two procedures of splitting with jumping are presented. The presented procedures allow increase flexibility of methods of forming a stream of polynomials based on a processed message.

Splitting with jumping is a procedure of splitting a message into a collection of polynomials of certain degree. We note that a few ways of realizing splitting with jumping have been presented in U.S. Non-Provisional patent application Ser. No. 13/057,030.

Let M be a message and let n be an integer such that $4 \leq n \leq 10$. The parameter n plays important role in the cipher; therefore we will refer the parameter to as a degree of splitting with jumping.

For any $s < t$ such that $t \leq |M|$ and $s > 0$ it may be possible to denote by $M(s,t)$ a part of a message M consisting of bits starting from s-th bit to up to t-th bit of M. We may refer elements $M(s,t)$ for any s, t such that $s < t$ and $t \leq |M|$ to $t-s+1$ bits sequences. For example, if M is 1001110110000, then $M(2,6)$ is 00111, while $M(5,10)$ is 110110.

First describe a q-splitting for an integer $1 \leq q \leq n$. Based on a message M the following collection of n-bits sequences $$M(1,n), M(1+q,n+q), M(1+2q,n+2q), M(1+3q,n+3q), \ldots \quad (i)$$

may be formed.

In fact n-bits sequences $$M(1,n), M(1+q,n+q), M(1+2q,n+2q), M(1+3q,n+3q), \ldots$$

may be interpreted as elements of $F_2^n$.

It may happen that the last l "remaining" bits of a message M for $0 \leq l < n$ may not be enough for forming the corresponding n-bit sequence. In this case a padding sequence of will be used to extend the process of a splitting with jumping.

Splitting with jumping may be define as a collection $$M(1,n), M(1+q_1,n+q_1), M(1+q_1+q_2,n+q_1+q_2), M(1+q_1+q_2+q_3,n+q_1+q_2+q_3), \ldots \quad (ii)$$

for some integer $1 \leq q_i \leq n$, $i=1, 2, \ldots$. Denote collection (ii) by $S(M,n)$. Integers $q_1, q_2, q_3, \ldots$ may be computed by some algorithm.

In an embodiment of the present invention a few ways of computing integers $q_1, q_2, q_3, \ldots$ may be presented. It may be possible, for instance, to set $$q_1 = q_2 = q_3 = \ldots = 1$$

or $$q_1 = q_2 = q_3 = \ldots = n.$$

For example, when $q_1 = q_2 = q_3 = \ldots = n$ a collection $S(M,n)$ is $$M(1,n), M(1+n,2n), M(1+2n, 3n), \ldots$$

and the elements of the collection are not "overlapped", that is, there is no any bit in M that would be presented in two different elements of $S(M,n)$. A splitting with jumping procedure, in which $$q_1 = q_2 = q_3 = \ldots = n$$

will be referred to as the splitting procedure with maximum jumping, or simply—splitting with maximum jumping.

In general, elements $q_1, q_2, q_3, \ldots$ will be referred to as jumping bit distances. When $q_1, q_2, q_3, \ldots$ are different it may be possible to define an algorithm, in accordance with which $q_1, q_2, q_3, \ldots$ are computed.

1. Splitting with Jumping I

In an embodiment of the present invention a splitting with jumping procedure may be defined as follows: for example, it is possible to set $q_i=1$ (or $q_i=n$) for $i \leq d(*)+2$ and then calculate for $i > d+2$ $$\omega_i = int(M(i-1, i+n-1) \oplus CUR_{i-2} \oplus$$

$$\oplus CUR^*_{i-3} \oplus \ldots \oplus CUR_{(i-d(*)-2)}^{d(*)}) \quad (iii)$$

where $CUR^*_{i-3}, \ldots, CUR_{i-d(*)-2}^{d(*)}$ are the elements of the iterated transformation of the corresponding degrees. The iterated transformation procedure is presented below. In general, any function defined on collection of elements $$M(i-1,i+n-1), M(i-2,i+n-2), \ldots, M(i-d-2,i+n-d-2),$$

$$CUR_{i-1}, CUR_{i-2}, CUR_{i-3}, \ldots, CUR_{i-d-2},$$

$$CUR^*_{i-1}, CUR^*_{i-2}, \ldots, CUR^*_{i-d-2}, \ldots, CUR_{(i-1)}^{d(*)}, \ldots, CUR_{(i-d-2)}^{d(*)} \quad (iv)$$

or some subset of the collection can be considered.

Then it is possible to define a mapping $$\phi: \{0, 1, \ldots, 2^n-1\} \rightarrow \{1, \ldots, n\}$$

and to obtain $$q_i = \phi(int(\omega_i)),$$

for $i = d(*)+2, d(*)+3, \ldots$.

In general, it may be possible to consider a collection of elements $$M(i-1-i_M, i-n-2-i_M), CUR_{i-2-i_0}, CUR^*_{i-3-i_1}, \ldots, CUR_{(i-d(*)-2-i_{d(*)})}^{d(*)} \quad (v)$$

for $i_M, i_0, \ldots, i_{d(*)} \geq 0$ such that $i > (\max\{i_M, i_0, \ldots, i_{d(*)}\} + d(*)+2)$. So a mapping $\phi$ may be defined based on an operation similar to operation (iii) involving the elements of collections (iv), (v) or some subsets of the collections. Thus, in an embodiment of the present invention it is possible to consider any operation $\omega$, which results in generating n-bit words based on the elements of collections (iv), (v) or some subsets of the collections.

In embodiments of the present invention it may be possible to change the processing speed for a message M by varying mappings $\phi$.

2. Splitting with Jumping II

In an embodiment of the present invention one more method of generating $q_i$, $i=1, \ldots$ may be presented. The method does not require using a mapping q and therefore, in general, it is faster and simpler.

It is possible to start with a table Spl containing nj elements. In general $nj \geq 2^n$. We denote by $Spl(i)$ i-th element of a table Spl, $i=1, \ldots, nj$. We note that $1 \leq Spl(i) \leq n$ for all $i=1, \ldots, nj$.

Then it may be possible to set $\omega_i = x$ for some $1 \leq x \leq n$ and $i < d(*)+1$ and then compute $\omega_i$ for $i > d(*)+2$ based on collections (iv) or (v) presented above, or some subset of the collections. In particular operation (iii) may be applied.

Next, we set $$q_1 = Spl(\omega_1),$$
$$q_2 = Spl((\omega_1 + \omega_2) \bmod nj),$$
$$q_3 = Spl((\omega_1 + \omega_2 + \omega_3) \bmod nj),$$
$$\ldots$$
$$q_i = Spl((\omega_1 + \omega_2 + \omega_3 + \ldots + \omega_i) \bmod nj)$$

Varying elements of a table Spl it is possible to vary the number k of generated elements (ii). For example, if all $q_i=1$, $i=1,\ldots$, then $k=\text{length}(M)-n+1$, where length(M) is a number of bits of a message M. On the other hand, if all $q_i=n$, $i=1,\ldots$, then $$k = \left\lceil \frac{\text{length}(M)}{n} \right\rceil,$$

where for any y by $\lceil y \rceil$ we denote the largest integer $x \leq y$. So, in general $$\left\lceil \frac{\text{length}(M)}{n} \right\rceil \leq k \leq \text{length}(M) - n + 1.$$

In embodiments of the present invention, by choosing different Spl tables it may be possible to change the processing speed for a message M. The larger jumping distances presented in a table, the faster processing procedure.

It may be noted that a degree of splitting with jumping n, constructions of ω that may be used in realizing methods presented in Splitting with jumping I, or Splitting with jumping II sections, mapping φ and Spl table are form initial values (IV) of a cipher. All IV parameters should be specified before realizing any step or procedure of a cipher.

B. Iterated Transformations

In an embodiment of the present invention a procedure of iterated transformations is presented. The presented construction of the iterated transformations allows processing a stream of polynomials without changing computational procedure for all polynomials of the stream.

It is possible to start with some notation.

Denote by L(n) an ordered collection of n integers and let L(i,n) be the i-th element of L(n), $i=1,\ldots,n$. Denote, further by Sub(L,x) such L'(n), that L'(1,n)=x, and L'(i,n)=L(i-1,n) for $i=2,\ldots,n$.

We denote by SubI(L,j,x) such L'(n), that L'(j,n)=x, for some $1 \leq j \leq n$ and L'(i,n)=L(i,n) for all $1 \leq i \leq n$, such that $i \neq j$.

We may write simply L when the number of the elements of the collection is fixed. In this case we may also write L(i) denoting the i-th element of L.

Denote by Ran(n) an ordered collection of randomly mixed integers $\{0, 1, \ldots, n-1\}$, so that all elements of Ran(n) are different.

Let M be a message and assume that the splitting with jumping procedure of some fixed degree $4 \leq n \leq 10$ is applied to M Thus, a sequence $M_1, M_2, \ldots, M_k$ for some k<NMB(M), where by NMB(M) a number of bits of a message M is denoted, may be generated in the result of applying a splitting with jumping procedure of a degree n. It may be possible to remind that $M_i$, $i=1,\ldots,k$ may be considered as a polynomial of degree less than n over $F_2$, or as an n-bit word.

Let f(x), g(x)∈$F_2$[x] be irreducible polynomials of degree n. There is an isomorphism of fields $$F_2[x]/f(x) \approx F_{2^n}.$$

Denote by $\phi_f$ the isomorphism of $F_2$-vector spaces $$F_2[x]/(f(x)) \to F_2^n.$$

Let δ and β be generators of $F_2[x]/(f(x))^*$ and $F_2[x]/(g(x))^*$, respectively.

Further we may generate $L_0 = Ran_1(2^n)$ and $V_0 = Ran_2(2^n)$, so that $L_0$ and $V_0$ are different ordered sequences containing $2^n$ integers, and may compute $$CUR_1 = M_1 \oplus \phi_f(\delta^{(t_1 + L_0(t_1, 2^n)) \bmod 2^n}) \oplus \phi_g(\beta^{(t_2 + V_0(t_2, 2^n)) \bmod 2^n}) \quad (1)$$

for the corresponding preliminary chosen $1 \leq t_1 \leq 2^n - 1$ and $1 \leq t_2 \leq 2^n - 1$. Next, we may calculate $$L_1 = Sub(L_0, int(CUR_1)), V_1 = Sub(V_0, int(M_1)),$$

and compute $CUR_2$ by $$CUR_2 = M_2 \oplus \phi_f(\delta^{(int(M_1) + L_1(int(M_1), 2^n)) \bmod 2^n}) \oplus$$
$$\oplus \phi_g(\beta^{(int(CUR_1) + V_1(int(CUR_1), 2^n)) \bmod 2^n}). \quad (2)$$

After that we may generate $$L_2 = Sub(L_1, int(CUR_2)), V_2 = Sub(V_1, int(M_1))$$

and calculate $$CUR_3 = M_3 \oplus \phi_f(\delta^{(int(M_2) + L_2(int(M_2), 2^n)) \bmod 2^n}) \oplus$$
$$\oplus \phi_g(\beta^{(int(CUR_2) + V_2(int(CUR_2), 2^n)) \bmod 2^n}). \quad (3)$$

For any i>3 and for $$L_{i-1} = Sub(L_{i-2}, int(CUR_{i-1})),$$
$$V_{i-1} = Sub(V_{i-2}, int(M_{i-1})),$$

it may be possible to compute $$CUR_i = M_i \oplus \phi_f(\delta^{(int(M_{i-1}) + L_{i-1}(int(M_{i-1}), 2^n)) \bmod 2^n}) \oplus$$
$$\oplus \phi_g(\beta^{(int(CUR_{i-1}) + V_{i-1}(int(CUR_{i-1}), 2^n)) \bmod 2^n}).$$

Denote by CUR the ordered collection of elements $$CUR_1, CUR_2, \ldots, CUR_k.$$

In yet another embodiment of the present invention the calculation of elements of CUR* may be achieved through involving the elements of CUR.

First of all, it is possible to choose irreducible polynomials f*(x),g*(x)∈$F_2$[x] of degree n. In general, f*(x),g*(x) are different from f(x),g(x) that were used during calculation of the elements of CUR. Then an isomorphism of fields $$F_2[x]/f^*(x) \approx F_{2^n}$$

may be considered. Denote by $\phi_{f^*}$ the isomorphism of $F_2$-vector spaces $$F_2[x]/(f^*(x)) \to F_2^n.$$

Then two generators δ* and β* of $F_2[x]/(f^*(x))^*$ and $F_2[x]/(g^*(x))^*$, respectively, may be picked. The generators may be different from δ and β that were used during the calculation of the elements of CUR.

Agreement about Generators

In an embodiment of the present invention an agreement in accordance with which we will keep using variables δ and β in expressions for $CUR^*_1, CUR^*_2, \ldots$ using symbols $\phi_{f^*}$ and $\phi_{g^*}$ for denoting the corresponding isomorphisms may be presented. It is possible to stress that using irreducible polynomials $f^*(x), g^*(x) \in F_2[x]$ of degree n, which in general are different from polynomials $f(x)$, $g(x)$, generators $\delta^*$ and $\beta^*$ of $F_2[x]/(f^*(x))^*$ and $F_2[x]/(g^*(x))^*$, correspondingly, may also be different from $\delta$ and $\beta$. The agreement simplifies expressions for iterated transformations of higher degrees, as there will be no need to use extra (upper or lower) indices for $\delta$ and $\beta$.

Continuing construction of elements of an iterated transformation of a higher degree, it may be possible to prepare $L^*_0 = \text{Ran}_3(2^n)$ different from $L_0$ and $V_0$ and then may compute $$CUR^*_1 = CUR_1 \oplus \phi_{f^*}(\delta^{(t^*1+L^*0(t^*1,2^n))\bmod 2^n}) \oplus \phi_{g^*}$$
$$(\beta^{(t^*2+L0(t^*2,2^n))\bmod 2^n})$$

for the corresponding preliminary chosen $1 \leq t^*_1 \leq 2^n - 1$ and $1 \leq t^*_2 \leq 2^n - 1$ and for $L_0$ that was used for the calculation of $CUR_1$. Then we may compute $L^*_1 = \text{Sub}(L^*_0, \text{int}(CUR^*_1))$ and calculate $$CUR^*_2 = CUR_2 \oplus \phi_{f^*}(\delta^{(\text{int}(CUR_1)+L^*1(\text{int}(CUR_1),2^n))\bmod 2^n}) \oplus$$

$$\oplus \phi_{g^*}(\beta^{(\text{int}(CUR^*_1)+L_1(\text{int}(CUR^*_1),2^n))\bmod 2^n}).$$

It may be noted again that we use $L_1$ for computing $CUR^*_2$, it is the same $L_1$ that was used when we computed $CUR_2$, thus, $L_1$ is used during calculations of both $CUR^*_2$ and $CUR_2$. Next, we may form $L^*_2 = \text{Sub}(L^*_1, \text{int}(CUR^*_2))$ and compute $$CUR^*_3 = CUR_3 \oplus \phi_{f^*}(\delta^{(\text{int}(CUR_2)+L^*2(\text{int}(CUR_2),2^n))\bmod 2^n}) \oplus$$

$$\oplus \phi_{g^*}(\beta^{(\text{int}(CUR^*_2)+L_2(\text{int}(CUR^*_2),2^n))\bmod 2^n}).$$

Once again, $L_3$ is the same collection that was used for calculating $CUR_3$.

For any $i > 3$ and for $L^*_{i-1} = \text{Sub}(L^*_{i-2}, \text{int}(CUR^*_{i-1}))$ we have $$CUR^*_i = CUR_i \oplus \phi_{f^*}(\delta^{(\text{int}(CUR_{i-1})+L^*i-1(\text{int}(CUR_{i-1}),2^n))\bmod 2^n}) \oplus$$

$$\oplus \phi_{g^*}(\beta^{(\text{int}(CUR^*_{i-1})+L_{i-1}(\text{int}(CUR^*_{i-1}),2^n))\bmod 2^n}). \quad (4)$$

An ordered collection $L_{i-1}$ is also may be used for calculating $CUR_i$.

The same approach of computing elements $$CUR_1^{d(*)}, CUR_2^{d(*)}, \ldots, CUR_k^{d(*)} \quad (4')$$

for any $d > 1$ may be applied; it is just necessary to generate different $\text{Ran}(2^n)$, based on which the computation may be started, and to choose the corresponding values $t_1^{d(*)}, t_2^{d(*)}$.

For any new $d \geq 1$ it may be also possible to pick different pairs of irreducible polynomials $f^{d(*)}(x)$, $g^{d(*)}(x)$ from $F_2[x]$, for which the isomorphisms $\phi_{f^{d(*)}}$ and $\phi_{g^{d(*)}}$ of the corresponding fields will be considered. In particular, all irreducible polynomials $f^*(x), \ldots, f^{d(*)}(x)$ may be the same as $f(x)$ and all irreducible polynomials $g^*(x), \ldots, g^{d(*)}(x)$ may be the same as $g(x)$, however in general they all may be different. By analogy, generators $\delta^*, \ldots, \delta^{d(*)}$ of the corresponding cyclic groups may be the same as $\delta$ and generators $\beta^*, \ldots, \beta^{d(*)}$ may be the same as $\beta$, though, in general they all may be different.

Elements (4') will be referred to as the elements of a transformation of degree d and the procedure of generating the elements of ordered collections $CUR, \ldots, CUR^{d(*)}$ for $d \geq 1$ will be referred to as the iterated transformations procedure of a degree d, or iterated masking procedure of a degree d. We may also refer the procedure to as an iterated transformation of a degree d. We may refer to d as a degree of iterated transformation, or a degree of iterated masking.

It may be noted that in accordance with the Agreement about generators presented above notations $\delta$ and $\beta$ may be used for different generators in expressions for transformations of different degrees. For calculating, say $CUR_i^{d(*)}$ for any $d \geq 2$, $i \geq 1$ we may use two collections of integers $L_{i-1}^{d(*)}$ and $L_i^{d(*)-1}$. The collection $L_{i-1}^{d(*)}$ may be formed during the process of computing $CUR^{d(*)}$ in the same way as collection $L^*_{i-1}$ was formed during the process of computing the elements of $CUR^*$, while collection $L_i^{d(*)-1}$ may be formed during the calculation of the elements of $CUR^{d(*)-1}$ in the same way as collection $L_i$ was formed during the calculation of the elements of $CUR$.

In an embodiment of the present invention collections $V_0$, $L_0, L^*_0, L^{**}_0, \ldots, L_0^{d(*)}$ may be defined as collections of any integers $a_i$, $0 \leq a_i \leq 2^n - 1$, $i = 1, \ldots, 2^n$.

For example, $V_0$ may consist of, say $2^n$ 0–s, $L_0$ may consist of $2^n$ elements each of which is equal to 5. On the other hand each element of the first $2^n/2$ elements of $L^*_0$ may be equal, for instance, to $2^n - 1$ and the rest of the elements of $L^*_0$ may be equal to 3, and so forth.

C. Changing Indices

In an embodiment of the present invention a procedure of changing indices of various elements that are used in the constructions for computing elements of $CUR, CUR^*, \ldots, CUR^{d(*)}$, $d \geq 2$ may be presented. The changing indices procedure allows constructing various types of the iterated transformations of degree greater than 1, which, in turn, increasing the possibilities for customizing a cipher.

Consider the presented above procedure of forming elements of $CUR$. In accordance with (1) the following expression for calculating $CUR_1$ may be used $$CUR_1 = M_1 \oplus \phi_f(\delta^{(t1+L0(t1,2^n))\bmod 2^n})$$
$$\oplus \phi_g(\beta^{(t2+V0(t2,2^n))\bmod 2^n})$$

for preliminary chosen $1 \leq t_1 \leq 2^n - 1$, $1 \leq t_2 \leq 2^n - 1$ and preliminary generated and different $L_0 = \text{Ran}_1(2^n)$ and $V_0 = \text{Ran}_2(2^n)$. We note that, in general $L_0$ and $V_0$ may contain any, integers $0 \leq x \leq 2^n - 1$ that may not necessarily be different. Then for any $i \geq 2$ and for $$L_{i-1} = \text{Sub}(L_{i-2}, \text{int}(CUR_{i-1})),$$

$$V_{i-1} = \text{Sub}(V_{i-2}, \text{int}(M_{i-1})), \quad (5)$$

$CUR_i$ may be computed by $$CUR_i = M_i \oplus \phi_f(\delta^{(\text{int}(M_{i-1})+L_{i-1}(\text{int}(M_{i-1}),2^n))\bmod 2^n}) \oplus$$

$$\oplus \phi_g(\beta^{(\text{int}(CUR_{i-1})+V_{i-1}(\text{int}(CUR_{i-1}),2^n))\bmod 2^n}). \quad (6)$$

It may be possible to use elements $M_1$ in (1) and $M_i$ in (5) (the first terms on the right sides of the expressions) with indices different from 1 and i, correspondingly. It may also be possible to compute the elements of $CUR, CUR^*, \ldots, CUR^{d(*)}$, $d \geq 2$ using terms $\text{int}(M_{i-1})$ and $\text{int}(CUR_{i-1})$ with indices different from $i-1$, that is, it may be possible to modify the computation of $CUR$ and $CUR^*, CUR^{**}, \ldots, CUR^{v(*)}$ using, for instance, index $i-2$, or $i-3$, or $i-5$ instead of $i-1$ in (3) and (4). Moreover it may be possible to change indices of various terms of expression $CUR_i$, $i \geq 2$ in a way different from changing indices of various terms in expression $CUR^*_i$ and, in turn, the changes may be different for terms in expression $CUR^{**}_i$ for $i \geq 2$, and so forth. The indices of elements $\text{int}(CUR_{i-1})$ and $\text{int}(M_{i-1})$ in (5) may also be changed and may be different for L and V. Furthermore, the changes of the indices for L and V may differ from the changes applied to $L^*, V^*, L^{}, V^{}, \ldots, L^{d(*)}, V^{d(*)}$.

In an embodiment of the present invention a general scheme of changing indices of any of the three terms for elements of $CUR, \ldots, CUR^{d(*)}$, $d \geq 1$ and the indices of elements involved in computations of collections $L, V, L^*, V^*, L^{}, V^{}, \ldots, L^{d(*)}, V^{d(*)}$ may be presented.

It may be important to emphasize that the indices of term $M_i$ in (6) and indices of $int(M_{i-1})$ and $int(CUR_{i-1})$ in (5) and (6) cannot exceed index i. It may be possible to describe the procedure that allows changing indices of various of terms starting with elements of CUR.

It may be possible to prepare five vectors (ordered collections) ADF, ADS, ADT, ADL and ADV containing $b_1, b_2, b_3, b_4$ and $b_5$, respectively, polynomials over $F_2$ of degree less than n. Denote by $ADF_j$ the j-th element of the vector ADF, $1 \leq j \leq b_1$. In the same way the elements of vectors ADS, ADT, ADL and ADV may be specified. The vectors ADF, ADS, ADT, ADL and ADV become initial values (IV) of the masking procedure of degree 0.

Without losing generality assume that $b_1=1$, $b_2=2$ and $b_3=3$, $b_4=2$, $b_5=3$. Using the elements of ADF, ADS, ADT, ADL and ADV we may compute $$CUR_1 = ADF_1 \oplus \phi_f(\delta^{(int(ADS_1)+L_0(int(ADS_1),2^n)) \bmod 2^n})$$

$$\oplus \phi_g(\beta^{(int(ADT_1)+V_0(int(ADT_1),2^n)) \bmod 2^n}) \quad (7)$$

for preliminary generated $L_0$ and $V_0$. Next, it may be possible to compute $L_1(2^n) = Sub(L_0, int(ADL_1))$, $V_1(2^n) = Sub(V_0, int(ADV_1))$, and calculate $$CUR_2 = M_1 \oplus \phi_f(\delta^{(int(ADS_2)+L_1(int(ADS_2),2^n)) \bmod 2^n}) \oplus$$

$$\oplus \phi_g(\beta^{(int(ADT_2)+V_1(int(ADT_2),2^n)) \bmod 2^n}). \quad (8)$$

Then again we may calculate $L_2(2^n) = Sub(L_1, int(ADL_2))$, $V_2(2^n) = Sub(V_1, int(ADV_2))$ and compute $$CUR_3 = M_2 \oplus \phi_f(\delta^{(int(M_1)+L_2(int(M_1),2^n)) \bmod 2^n}) \oplus$$

$$\oplus \phi_g(\beta^{(int(ADT_3)+V_2(int(ADT_3),2^n)) \bmod 2^n}). \quad (9)$$

After generating $L_3(2^n) = Sub(L_2, int(CUR_1))$, $V_3(2^n) = Sub(V_2, int(ADV_3))$ it may be possible to continue $$CUR_4 = M_3 \oplus \phi_f(\delta^{(int(M_2)+L_3(int(M_2),2^n)) \bmod 2^n}) \oplus$$

$$\oplus \phi_g(\beta^{(int(CUR_1)+V_3(int(CUR_1),2^n)) \bmod 2^n}). \quad (10)$$

Thus, for any $i > 4$ and $$L_{i-1}(2^n) = Sub(L_{i-2}, int(CUR_{i-b_4})),$$

$$V_{i-1}(2^n) = Sub(V_{i-2}, int(M_{i-b_5}))$$

it may be possible to compute $$CUR_i = M_{i-b_1} \oplus \phi_f(\delta^{(int(M_{i-b_2})+L_{i-1}(int(M_{i-b_2}),2^n)) \bmod 2^n}) \oplus$$

$$\oplus \phi_g(\beta^{(int(CUR_{i-b_3})+V_{i-1}(int(CUR_{i-b_3}),2^n)) \bmod 2^n}). \quad (11)$$

It may be understood that if $b_1 > 0$ then the number of generated elements of CUR will be greater than the number of elements of $S(M,n)$.

In an embodiment of the present invention the described above procedure of changing the indices may be applied during the computation of the elements of $CUR^*, \ldots, CUR^{d(*)}$ and the corresponding collections $L^*, L^{**}, \ldots, L^{d(*)}$, $d \geq 2$. It may be just necessary to prepare vectors $$ADF^*, ADS^*, ADT^*, ADL^*, \ldots, ADF^{v(*)}, ADS^{v(*)}, ADT^{v(*)}, ADL^{v(*)},$$

containing, respectively, $$b^*_1, b^*_2, b^*_3, b^*_4, b^*_5, \ldots, b_1^{d(*)}, b_2^{d(*)}, b_3^{d(*)}, b_4^{d(*)}, b_5^{d(*)}$$

polynomials over $F_2$ of degree less than n and apply the described above procedure of the modification of calculation of the elements of $CUR^{d(*)}$ for any $d \geq 1$.

Changing indices in a framework of an iterated transformation procedure of any degree will be referred to as applying procedure of changing indices to an iterated transformation, or iterated masking procedure.

D. Generating Bit Strings

In an embodiment of the present invention a few ways of generating bit strings may be presented. In particular, the bit strings may be formed in accordance with the methods presented in U.S. Non-Provisional patent application Ser. No. 13/057,030. The presented constructions of bit strings generation give additional flexibility in choosing that or another method of forming the bit strings. Presented in an embodiment of the present invention two constructions of forming bit strings are fast and convenient for implementation in both software and hardware.

The bit strings are row matrices containing bits 0 or 1. Bit strings are associated, or related to transformations of the corresponding degrees. The number of the generated bit strings may also vary. In general it may be possible to form up to $$2^n(d+1),$$

bit strings associated to collections $CUR, \ldots, CUR^{d(*)}$, $d \geq 1$.

Without losing generality it may be possible to fix some degree $4 \leq n \leq 10$ of a splitting with jumping and denote by $Sub(2^n, m_0)$ a collection of $m_0 \geq 1$ non empty subsets $S_i \subset \{0, 1, \ldots, 2^n-1\}$ such that $S_i \cap S_j = \emptyset$ for all $i \neq j$, $i,j = 1, \ldots, \overline{m_0}$ and $$S_1 \cup S_2 \cup \ldots \cup S_m = \{0, 1, \ldots, 2^n-1\}.$$

If $m_0 = 1$ then $Sub(2^n, m_0)$ is $\{0, 1, \ldots, 2^n-1\}$. If $m_0 = 0$ then $Sub(2^n, m_0)$ is $\emptyset$.

Consider $Sub(2^n, m_0)$ for some $m_0 \geq 1$ and prepare m bit strings $\epsilon_1, \ldots, \epsilon_{m_0}$ of sizes $\sigma_1, \ldots, \sigma_{m_0}$, correspondingly. It may be noted that bit strings $\epsilon_1, \ldots, \epsilon_{m_0}$ are prepared for the elements of a collection CUR that are computed for the same n, for which $Sub(2^n, m_0)$ was constructed. Then it may be possible to associate bit string $\epsilon_1$ with $S_1$, $\epsilon_2$ with $S_2, \ldots, \epsilon_{m_0}$ with $S_{m_0}$ and denote by $\epsilon_i(t)$ the t-th bit of bit string $\epsilon_i$, $i = 1, \ldots, m_0$ and $t = 1, \ldots, \sigma_i$. We will say that bit strings $\epsilon_1, \ldots, \epsilon_{m_0}$ are related, or associated to a collection CUR.

Next, $m_0$ ordered sets of non zero integers $\Delta_i$ may be prepared and by $pw_i$ the number of elements in each $\Delta_i$, that is $pw_i = |\Delta_i|$ may be denoted. In general $pw_i \neq 0$, $i = 1, \ldots, m_0$. Denote by $\Delta_i(j)$ the j-th element of $\Delta_i$ for $j = 1, \ldots, pw_i$ and $i = 1, \ldots, m_0$. It may be remarked that, in general $pw_i$ may be greater than $2^n$ for $i = 1, \ldots, m_0$, though this is not necessarily.

Additionally, variables $t_i$, $i = 1, \ldots, k$ may be used for denoting various positions of bit strings during updating procedure.

1. Forming Bit Strings I

In an embodiment of the present invention the procedure of updating the bit strings related to a collection CUR during the calculation of elements $CUR_1, \ldots, CUR_k$ may be presented. The presented procedure is based on using specially defined mappings and this leads to constructing a wide class of methods of updating bit strings.

From the very beginning all bits of all the bit strings may be set to 0. It may be possible to start with considering $m_0$ mappings $$\alpha_i: \{0, 1, \ldots, 2^n-1\} \to \Delta_i$$

where $i=1, \ldots, m_0$.

It may be noted that for any $CUR_i$, $i=1, \ldots, k$ there takes place $0 \le int(CUR_i) \le 2^n-1$.

We compute $CUR_1$ and assume that $int(CUR_1) \in S_u$ for some $1 \le u \le m_0$. It means that bit string $\epsilon_u$ may be updated. It may be possible to calculate $$p = \alpha_u(int(CUR_1))$$

and set $$\epsilon_u(p) = B \oplus 1, \quad (12)$$

where $\oplus$ is xor-operation and B is the value of the p-th bit before updating. As from the beginning all the bits of all bit strings were set to 0, it means that the value of B in (12) is 0.

An element $CUR_2$ may be computed and it may be assumed, for instance, that $int(CUR_2) \in S_u$, that is, we may need again update bit string $\epsilon_u$. It may be possible to calculate $$p = (\alpha_u(int(CUR_1)) + \alpha_u(int(CUR_2))) \bmod \sigma_u$$

and set $$\epsilon_u(p) = B \oplus 1,$$

where again B is the p-th value of bit string $\epsilon_u$.

Assume that after computing $CUR_3$ $int(CUR_3) \in S_v$ for some $1 \le v \le m_0$, such that $v \ne u$, that is bit string $\epsilon_v$ should be updated. It may be possible to increment p by $$\alpha_v(int(CUR_3)),$$

so that p becomes equal to $$((\alpha_u(int(CUR_1)) + \alpha_u(int(CUR_2))) \bmod \sigma_u + \alpha_v(int(CUR_3))) \bmod \sigma_v$$

and update bit string $\epsilon_v$ by setting $$\epsilon_v(p) = B \oplus 1,$$

where again, B is a value of the p-th bit of bit string $\epsilon_v$ before updating.

Assume that after i-1-th stage of processing CUR the value of p was r and assume that on the i-th stage of the calculation an element $CUR_i$ is computed and $int(CUR_i) \in S_w$ for some $1 \le w \le m_0$, $4 \le i \le k$. The new value of p may be computed by $$p = (r + \alpha_w(int(CUR_w))) \bmod \sigma_w$$

and update bit string $\epsilon_w$ by setting $$\epsilon_w(p) = B \oplus 1,$$

where B is the value of the p-th bit of bit string $\epsilon_w$ before updating.

It may be possible to continue the computation of $CUR_j$, $i < j \le k$ and the procedure of updating bit strings $\epsilon_i$, $i=1, \ldots, m_0$, up to the moment when the whole message is processed.

In an embodiment of the present invention the described above method of updating the bit strings related to a collection CUR may be expanded on the bit strings related to any collection $CUR^*$, $CUR^{**}, \ldots, CUR^{d(*)}$ for any $d > 2$. It is necessary to form mappings $$\alpha_i^*: \{0, 1, \ldots, 2^n - 1\} \to \Delta_i^*, i = 1, \ldots, m_1,$$

$$\alpha_i^{}: \{0, 1, \ldots, 2^n - 1\} \to \Delta_i^{}, i = 1, \ldots, m_2,$$

...

$$\alpha_i^{d(*)}: \{0, 1, \ldots, 2^n - 1\} \to \Delta_i^{d(*)}, i = 1, \ldots, m_{d(*)}$$

for the corresponding collections of subsets $$Sub^*(2^n, m_1), Sub^{**}(2^n, m_2), \ldots, Sub^{d(*)}(2^n, m_{d(*)}),$$

and update collections of bit strings $$\epsilon_1^*, \ldots, \epsilon_{m_1}^*,$$

$$\epsilon_1^{}, \ldots, \epsilon_{m_2}^{},$$

...

$$\epsilon_1^{d(*)}, \ldots, \epsilon_{m_{d(*)}}^{d(*)}$$

of sizes $$\sigma^*_1, \ldots, \sigma^*_{m_1}, \ldots, \sigma_1^{d(*)}, \ldots, \sigma_{m_{d(*)}}^{d(*)},$$

respectively, in accordance with the presented above procedure.

2. Forming Bit Strings II

In an embodiment of the present invention one more method of updating bit strings may be presented. In a framework of the presented method mappings $\alpha_i$, $i=1, \ldots, m_0$ may not be needed and thus, the presented method of updating bit strings may be simpler and faster.

It may be possible to start with a transformation of degree 0. Assume that a collection of subsets $Sub(2^n, m_0), m_0 \ge 1$ is prepared and bit strings $\epsilon_1, \ldots, \epsilon_{m_0}$ of sizes $\sigma_1, \ldots, \sigma_{m_0}$, correspondingly, are formed. From the very beginning all the bits of all bit strings are set to 0. Then, ordered sets $\Delta_i$ containing, correspondingly, $pw_i$ non-zero integers may be prepared, and pointers $p_i$ may be reserved, $i=1, \ldots, m_0$. At last $m_0$ variables $p_1, \ldots, p_{m_0}$, which may be used for denoting various elements of $\Delta_1, \ldots, \Delta_{m_0}$ obtained during a procedure presented below, may be reserved.

An element $CUR_1$ may be computed and it may be assumed that $int(CUR_1) \in S_u$ for some $1 \le u \le m_0$, that is, bit string $\epsilon_u$ may be updated. It may be possible to calculate $$p_u = \Delta_u(int(CUR_1)),$$

$$t_1 = p_u \bmod \sigma_u$$

and set $$\epsilon_u(t_1) = B \oplus 1,$$

where $\oplus$ is xor-operation and B is the value of the $t_1$-th bit of bit string $\epsilon_u$ before updating and $\Delta_u(int(CUR_1))$ is the int $(CUR_1)$-th element of the ordered set $\Delta_u$.

Next, $CUR_2$ may be computed and it may be assumed that $int(CUR_2) \in S_u$, that is, bit string $\epsilon_u$ may be updated again. It may be possible to compute $$p_u = \Delta_u((int(CUR_1) + int(CUR_2)) \bmod pw_u),$$

$$t_2 = (t_1 + p_u) \bmod \sigma_u$$

and set $$\epsilon_u(t_2) = B \oplus 1,$$

where, again B is the value of the $t_2$-th bit of bit string $\epsilon_u$ before updating.

Next, $CUR_3$ may be computed and assume that $int(CUR_3) \in S_v$ for some $1 \le v \le m_0$, such that $v \ne u$, that is, bit string $\epsilon_v$ may be updated. It may be possible to calculate $$p_v = \Delta_v(int(CUR_3)),$$

$$t_3 = (t_2 + p_v) \mod \sigma_v$$

and set $$\epsilon_v(t_3) = B \oplus 1$$

where B is the value of the $t_3$-th bit of bit string $\epsilon_v$ before updating.

On the i-th stage of the computation an element $CUR_i$ is computed and assume that $int(CUR_i) \in S_w$ for some $1 \le w \le m_0$, that is, bit string $\epsilon_w$ may be updated. Let the value of $p_w$ at the moment of updating be r. The new value of $p_w$ may be calculated by $$p_w = \Delta_w((r + int(CUR_i)) \mod pw_w),$$

$t_i$ may be calculated in accordance with $$t_i = (t_{i-1} + p_w) \mod \sigma_w$$

and bit string $\epsilon_w$ may be updated by $$\epsilon_w(t_i) = B \oplus 1,$$

where B is the $t_i$-th bit of bit string $\epsilon_w$ before the updating.

The procedure of updating all bit strings $\epsilon_i$, $i=1, \ldots, m_0$, may be continued up to the moment when the calculation of the last element of a collection CUR is completed.

In an embodiment of the present invention the presented above method of forming the bit strings related to a collection CUR may be expanded on the bit strings related to collections $CUR^*, \ldots, CUR^{d(*)}$ for any $d \ge 2$. It may be necessary to build collections $$Sub^*(2^n, m_1), \ldots, Sub^{d(*)}(2^n, m_{d(*)}),$$

of not empty subsets, form ordered sets of non-zero integers $$\Delta_i^*, pw_i^* = |\Delta_i^*|, i = 1, \ldots, m_1, m_1 \ge 1,$$

$$\Delta_i^{}, pw_i^{} = |\Delta_i^{**}|, i = 1, \ldots, m_2, m_2 \ge 1,$$

$$\ldots$$

$$\Delta_i^{d(*)}, pw_i^{d(*)} = |\Delta_i^{d(*)}|, i = 1, \ldots, m_{d(*)}, m_{d(*)} \ge 1$$

and to update bit strings $$\epsilon_1^*, \ldots, \epsilon_{m_1}^*,$$

$$\epsilon_1^{}, \ldots, \epsilon_{m_2}^{},$$

$$\ldots$$

$$\epsilon_1^{d(*)}, \ldots, \epsilon_{m_{d(*)}}^{d(*)}$$

of sizes $$\sigma_1^*, \ldots, \sigma_{m_1}^*, \ldots, \sigma_1^{d(*)}, \ldots, \sigma_{m_{d(*)}}^{d(*)},$$

correspondingly, in accordance with the presented above procedure.

In an embodiment of the present invention collections containing up to $2^n$ bit strings of different sizes may be prepared for each collection $$CUR, CUR^*, \ldots, CUR^{d(*)}, d \ge 2 \quad (12')$$

and the bit strings may be updated during the computation of the elements of collections (12') either in accordance with the method presenting in "Forming the bit strings I", or "Forming the bit strings II".

E. Encryption without Filters

In an embodiment of the present invention a method of computing a ciphertext for a message M and a key K without using filters may be presented. The presented method of generating a ciphertext based on a message M does not involve bit strings for computing elements of transformations of various degrees.

1. Choosing the Size of a Key

In an embodiment of the present invention, depending on a chosen n, it may be recommended to apply the following sizes of a key during the process of generating a ciphertext for a message M. If n=4 then the size of a key may be at least 64 bits, if n=5 then the size of a key may be at least 160 bits, if n=6 then the size of a key may be at least 384 bits, if n=7 then the size of a key may be at least 896 bits, if n=8 then the size of a key may be at least 2048 bits, if n=9 then the size of a key may be at least 4608 bits, if n=10 then the size of a key may be at least 10240 bits. The motivation of the presented above sizes of the keys will be presented below. It may be noted that the size of a key for a degree of splitting n is equal to $n2^n$. Indeed, for n=4 the size of a key is $4*16=64$, for n=5 the size of a key is $5*32=160$, and so forth.

2. Generating a Ciphertext

In an embodiment of the present invention an encryption scheme without applying a keystream generated during computing a ciphertext may be presented. We will refer the scheme to as an encryption without filters.

An encryption procedure with applying keystreams generated during the process of forming a ciphertext will be referring to as an encryption with filters and will be presented later.

An encryption procedure may be started with applying splitting with jumping procedure, the iterated transformation procedure of a degree d>0 and forming the bit strings procedure. Therefore a collection of various parameters related to the procedures may need to be specified.

Firstly a degree n of a splitting with jumping procedure, where $4 \le n \le 10$ and a degree d of the iterated transformation procedure, where $d \ge 2$ may be chosen. Next, elements of collections $CUR, \ldots, CUR^{d(*)}$ may be generated in accordance with the procedure described in "Iterated transformation" section. Before applying the procedure of iterated masking, collections $$L_0, V_0, \ldots, L_0^{d(*)} \quad (13)$$

may be specified, $d \ge 2$. It may be noted that $L_0, V_0, \ldots, L_0^{d(*)}$ may be generated as $Ran_1(2^n), Ran_2(2^n), \ldots, Ran_{d(*)+2}(2^n)$; however, in general they may contain repeated integers. Besides, pairs of irreducible polynomials $$f, g, f^*, g^*, \ldots, f^{d(*)}, g^{d(*)} \quad (13')$$

along with pairs of generators $$\delta, \beta, \delta^*, \beta^*, \ldots, \delta^{d(*)}, \beta^{d(*)} \quad (13'')$$

of cyclic groups $$F_2[x]/(f(x))^*, F_2[x]/(g(x))^*, F_2[x]/(f^*(x))^* \text{ and } F_2[x]/(g^*(x))^*, \ldots, F_2[x]/(f^{d(*)}(x))^* F_2[x]/(g^{d(*)}(x))^*,$$

correspondingly, may also be defined. The isomorphisms of vector spaces $$F_2[x]/(f(x)) \to F_2^n, F_2[x]/(g(x)) \to F_2^n, \ldots, F_2[x]/(f^{d(*)}(x)) \to F_2^n, F_2[x]/(g^{d(*)}(x)) \to F_2^n \quad (13''')$$

may be defined as well.

If the changing indices procedure that was described in "Changing indices" section of the present invention is applied, then vectors $$ADF, ADS, ADT, ADL, ADV, \ldots, ADF^{d(*)}, ADS^{d(*)}, ADT^{d(*)}, ADL^{d(*)}, \quad (14)$$

containing, respectively, $$b_1, b_2, b_3, b_4, b_5, b_6, \ldots, b_1^{d(*)}, b_2^{d(*)}, b_3^{d(*)}, b_4^{d(*)}, b_5^{d(*)} \quad (15)$$

polynomials over $F_2$ of degree less than n may need to be specified.

In an embodiment of the present invention a procedure of forming the bit strings may be further applied, so it may be necessary to define a collection of parameters related to the bit strings. Firstly, collections $$Sub(2^n, m_0), Sub^*(2^n, m_1), \ldots, Sub^{d(*)}(2^n, m_{d(*)}) \quad (16)$$

may be specified. Without losing generality it may be possible to consider the case when bit strings are built for all collections CUR, ..., $CUR^{d(*)}$, $d \geq 2$, though in general, the bit strings may be prepared not for all collections of polynomials CUR, ..., $CUR^{d(*)}$, $d \geq 2$. Then, d+1 ordered sets of non zero integers $$\Delta_i, i = 0, \ldots, d(*) \quad (17)$$

containing $pw_i$ elements, correspondingly, may also be prepared. If the bit strings are formed in accordance with the method proposed in section "Forming the bit strings I", then additionally d+1 mappings $$\alpha_i: \{0, 1, \ldots, 2^n - 1\} \to \Delta_i \quad (18)$$

may be formed, $i = 0, \ldots, d$. Eventually bit strings $$e_1, \ldots, e_{m_0}, \ldots, e_1^{d(*)}, \ldots, e_{m_{d(*)}}^{d(*)} \quad (19)$$

of sizes, respectively, $$\sigma_1, \ldots, \sigma_{m_0}, \ldots, \sigma_1^{d(*)}, \ldots, \sigma_{m_{d(*)}}^{d(*)}, \quad (20)$$

associated with collections CUR, ..., $CUR^{d(*)}$, correspondingly, may be prepared. From the beginning all the bit of the bit strings (19) may be set to 0.

In an embodiment of the present invention ordered collections of integers (13), irreducible polynomials (13') of degree n, generators (13") of the corresponding cyclic groups, isomorphisms of vector spaces (13'''), collections of subsets (16), ordered sets of non-zero elements (17) and the bit strings (19) of sizes presented in (20) form initial values (IV) of a cipher. Collections (14) of polynomials over $F_2$ of degree less than n containing number of polynomials presented in (15), correspondingly, are also the part of IV of the cipher. If the bit strings are formed in accordance with the method proposed in section "Forming the bit strings I", then mappings (18) are also part of IV.

After specifying IV of the presented above procedures a procedure of forming a ciphertext may be presented.

Assume that M is a message that we wish to encrypt. We may choose a key K with the size, specified in accordance with the presented above procedure.

In an embodiment of the present invention the process of encrypting a message M using a key K may involve the splitting with jumping procedure, the iterated masking procedure of degree $d \geq 2$ and the forming bit strings procedure and a padding procedure.

The process of encrypting a message may be split into three stages. The first stage is related to processing a key part of concatenation K||M||BS, where K and M are a key and a message, respectively, and BS is a padding sequence of bit that will be described below. The three procedures (the splitting with jumping procedure, the iterated masking procedure of degree $d \geq 2$ and the forming the bit strings procedure) are applied to the concatenation. During the first stage collections L, V, L*, ..., $L^{d(*)}$ and bit strings (19) are updated. The first stage is completed when the last n-bit word generated by a splitting with jumping procedure and containing just bits of a key K is processed. In other words, the next n-bit word generated by a splitting with jumping procedure after the first stage of the computation contains at least one bit from a message M. It may be stressed that in the case of a splitting procedure with maximum jumping the first stage is completed when the last n-bit word of a key is processed (it is assumed that the size of a key K is chosen in accordance with the presented above scheme), so the first element of the second stage in this case would be the first n-bit word of a message M. Denote by rf the number of the last bits of a key K that are included into the first n-bit word of the second stage of the computation. It may be noted that $0 \leq rf < n$. Denote the last rf bits of a key K by $K_{rf}$.

Thus, it may be possible to say that the second stage of the computation of a ciphertext begins with processing a subsequence of bits $K_{rf}||M$ of a sequence K||M. It may be important to note that the first stage of the generating a ciphertext is the preliminary one, which means that no part of a ciphertext is generated during the first stage.

Thus, the splitting with jumping procedure, the iterated masking procedure of degree $d \geq 2$ and the forming bit strings procedure are continued to be applied and the first element of the splitting with jumping, which is formed during the second stage is an n-bit word, which is a concatenation of $K_{rf}$ and the first n−rf bits of a message M. The second stage is completed, when the last n-bit word generated by a splitting with jumping procedure of a sequence $K_{rf}||M$ is processed. In other words, the next n-bit word generated by a splitting with jumping procedure after the second stage of the computation contains at least one bit from a sequence BS, where BS is formed from a collection of bit strings (19) in accordance with a procedure presented below. The second stage is completed when a sequence of bits $K_{rf}||M$ is processed. Denote by $$CUR_1^{d(*)}, CUR_2^{d(*)}, \ldots, CUR_l^{d(*)} \quad (21)$$

elements (that is, n-bit words) of the transformation procedure of degree $d \geq 2$ generated during the second stage. Denote by rs the number of the last bits of a sequence $K_{rf}||M$ that are included into the first n-bit word of the third stage of the computation contains. It may be noted that $0 \leq rs < n$. Denote the last rs bits of a sequence $K_{rf}||M$ by $M_{rs}$.

The third stage begins with processing a sequence of bits $M_{rs}||BS$, where BS is a sequence of bits that is formed based on a collection of bit strings (19).

In an embodiment of the present invention a few methods of forming a sequence BS may be presented.

Assume that all the bit strings presented in (19) have the same lengths, that is $$\sigma_1 = \sigma_2 = \ldots = \sigma_{m_0} = \ldots = \sigma_1^{d(*)} = \ldots = \sigma_{m_{d(*)}}^{d(*)}.$$

In this case it may be possible to form BS by $$BS = \sigma_1 \oplus \sigma_2 \oplus \ldots \oplus \sigma_{m_0} \oplus \ldots \oplus \sigma_1^{d(*)} \oplus \ldots \oplus \sigma_{m_{d(*)}}^{d(*)}. \quad (22)$$

If bit strings (19) have different lengths, assume that the bit strings may be split into two groups and the bit strings inside of each group have the same length. In this case BS may be formed in accordance with $$BS = \Sigma_{GR_1} \| \Sigma_{GR_2}, \quad (23)$$

where $\Sigma_{GR_1}$ is a result of xor-ing of all the bit strings from the first group and $\Sigma_{GR_2}$ is a result of xor-ing of all the bit strings from the second group.

In general, this method may be expanded into any number of the groups of the bit strings. We note also that, in general, different order of $\Sigma_{GR1}$ and $\Sigma_{GR_2}$ in (23) may result in forming different sequences BS. Therefore it may be possible to demand that $\Sigma_{GR1}$ in (23) contains the bit strings of a smaller length, while $\Sigma_{GR_2}$ contains the bit strings of a bigger length. This order of sequences of bits may be expanded on any number of groups and in a framework of which group the bit strings have the same length. In other words, if ng groups may be considered for a collection of bit strings (19), then $$nb(\Sigma_{GR_1}) \le nb(\Sigma_{GR_2}) \le nb(\Sigma_{GR_3}) \le \ldots \le nb(\Sigma_{GR_{ng}})$$

where $nb(\Sigma_{GR_i})$ is the length of the bit strings (in bits) that form a group $\Sigma_{GR_i}$, i=1, 2, . . . , ng.

The third stage is completed when a sequence of bits $M_{rs} \| BS$ is processed. It may happen again that last rt bits of a sequence of bits BS, where $0 \le rt < n$ cannot be processed as rt bits may not be enough to form an n-bit element of splitting with jumping.

In an embodiment of the present invention it may be stressed that during the first and the second stages of generating a ciphertext bit strings (19) are constantly updated in accordance with the applied Forming the bit strings I, or Forming the bit strings II procedures presented above. It also may be possible to emphasize that, in general one of the presented procedures of forming the bit strings (for instance, Forming the bit strings I procedure) may be applied to a part of bit strings (19), while another procedure may be applied to remaining part of the bit strings. Thus, both procedures of forming bit strings may be applied during the process of generating a ciphertext in a framework of a transformation of any degree. The process of updating the bit strings is continued during the third stage of the computation.

Denote by $$CUR_{T_1}^{d(*)}, CUR_{T_2}^{d(*)}, \ldots, CUR_{T_p}^{d(*)} \quad (24)$$

the elements of the masking procedure of degree $d \ge 2$ generated during processing a sequence $M_{rs} \| BS$, $$p \ge (\Sigma nb(\Sigma_{GR_i}))/n,$$

for i=1, 2, . . . , k. A ciphertext of a message M is a sequence of bits $$CUR_1^{d(*)} \| CUR_2^{d(*)} \| \ldots \| CUR_l^{d(*)} \| CUR_{T_1}^{d(*)} \| \ldots \| CUR_{T_p}^{d(*)} \| s_1 \| LB, \quad (25)$$

where $s_1$ is an s-bit word consisting of 1, s=NBC mod 8, $0 \le s < 8$ and NBC is a number of bits of a sequence $$CUR_1^{d(*)} \| CUR_2^{d(*)} \| \ldots \| CUR_l^{d(*)} \| CUR_{T_1}^{d(*)} \| \ldots \| CUR_{T_p}^{d(*)}. \quad (25')$$

It may be noted that part (25') of a ciphertext (25) may not be divisible by 8, that is, it may not be presented as a file. Therefore it may be necessary to add to a sequence of bits (25') an s-bit word consisting of bits 1 to make a sequence $$CUR_1^{d(*)} \| CUR_2^{d(*)} \| \ldots \| CUR_l^{d(*)} \| CUR_{T_1}^{d(*)} \| \ldots \| CUR_{T_p}^{d(*)} \| s_1 \quad (25'')$$

divisible by 8. At last, LB is an informational part of a ciphertext, the length of which is 2 bytes and which contains numbers rf, rs, rt and s. As $4 \le n \le 10$ and $0 \le s < 8$ it may be enough to use 4 bits to represent each of the numbers rf, rs, rt (and s, of course); this why the size of LB is two bytes. The four numbers will be used during deciphering procedure.

In an embodiment of the present invention a ciphertext of a message M is a concatenation of elements of collections (21), (24) a sequence of bit $s_1$ and LB where each element $CUR_i^{d(*)}$, i=1, . . . , l, $T_1$, . . . , $T_l$ is presented as an element of $F_2^n$, that is, as an n-bit word.

The procedure of forming a ciphertext (25) may be also understood as a concatenation of those elements of the iterated masking procedure of degree $d \ge 2$ computed during processing a sequence $K \| M \| BS$ that are generated during the second and the third stages of processing. The elements of the masking procedure of a degree $d \ge 2$ that are generated during the first stage of the processing are not included into a ciphertext. It may be also possible to note that the bit strings are updated during all three stages of processing a sequence $K \| M \| BS$, though BS is formed based on the bit strings formed during the first and second stages of the computation. It may be emphasized that adding the concatenated elements of a collection (24) to a ciphertext is very important, as the concatenation plays a role of a padding sequence. As an encrypted message may be short (for instance, a few bytes) it may be necessary to pad it to generate a cipher of a quite large size (in general, larger than the size of a key), and as we do not know the size of a message that is going to be encrypted beforehand, all messages are padded.

3. Decryption

In an embodiment of the present invention a method of decrypting a ciphertext generated by the encryption procedure without filters with the use of a key and IV may be presented.

Assume that a receiver has obtained a ciphertext (25), that is, a collection of bits $$CUR_1^{d(*)} \| CUR_2^{d(*)} \| \ldots \| CUR_l^{d(*)} \| CUR_{T_1}^{d(*)} \| \ldots \| CUR_{T_p}^{d(*)} \| s_1 \| LB.$$

A receiver knows a key K, parameters of IV of the algorithm and the algorithm itself, based on which a ciphertext (25) was generated. Consider, first, the case when a changing indices procedure is not applied to the iterated masking procedure of the corresponding degree during generation of a ciphertext. A receiver may start the decryption procedure with processing a key, that is, applying a splitting with jumping procedure, the iterated transformation procedure of a degree d and forming the bit strings procedure to a key K. In the result of the processing a key K elements $$W_1, W_2, \ldots, W_v \quad (26)$$

$$CURR_1, CURR_2, \ldots, CURR_v,$$

$$CURR_1^*, CURR_2^*, \ldots, CURR_v^*,$$

$$\ldots$$

$$CURR_1^{d(*)}, CURR_2^{d(*)}, \ldots, CURR_v^{d(*)}$$

are generated.

It may be noted that $W_1, W_2, \ldots, W_v$ are the elements of $S(K \| M, n)$, that is the elements that were generated during the splitting with jumping procedure; besides, $W_v$ is such an element of $S(K \| M, n)$ that contains only bits from a key K. In other words, the next n-bit word generated by a splitting with jumping procedure contains at least one bit from M. Here $CURR_1, CURR_2, \ldots, CURR_v$, are the elements that were computed based on $W_1, W_2, \ldots, W_v$ and the corresponding collections $L_i$ and $V_i$, $i=1, \ldots, v$ in accordance with the transformation procedure of degree 0 presented above. Elements $CURR^*_1, CURR^*_2, \ldots, CURR^*_v$ were computed based on $CURR_1, CURR_2, \ldots, CURR_v$ and the corresponding collections $L_i$ and $L^*_i$, $i=1, \ldots, v$ in accordance with the transformation procedure of a degree 1, and so forth. The notation $CURR_i, \ldots, CURR_i^{d(*)}$, $i=1, \ldots, v$ was used to emphasize the difference between the elements of iterated transformation applied to the elements $W_i$, $i=1, \ldots, v$ of $S(K\|M,n)$ and the elements that were generated during the second and the third stages of the encryption.

It may be possible to stress, that during processing a key K, collections $$L_i, V_i, L^*_i, \ldots, L_i^{d(*)}, \tag{27}$$

$i=1, \ldots, v$ are also generated in accordance with the iterated transformation procedure presented above using presented as part of IV vectors $L_0, V_0, L^*_0, \ldots, L_0^{d(*)}$. For example, it may be possible to present the following computations related to collections (27) performed during processing a key K $$L_v = Sub(L_{v-1}, CURR_v), \tag{27'}$$
$$V_v = Sub(V_{v-1}, W_v),$$
$$L^*_v = Sub(L^*_{v-1}, CURR^*_v),$$
$$\ldots$$
$$L_v^{d(*)} = Sub(L_{v-1}^{d(*)}, CURR_v^{d(*)}).$$

Next, a receiver may start using a ciphertext in order to obtain a plaintext after computing all elements presented in (26) and (27). The first n-bit word of a ciphertext is $CUR_1^{d(*)}$. Therefore based on (26), (27) and $CUR_1^{d(*)}$ a receiver needs to compute the first n-bit word of a sequence $K_{rf}\|M$, where, again $K_{rf}$ is a sequence of last $0 \leq rf < n$ bits of a key K. In order to obtain the n bits of $K_{rf}\|M$, a receiver preliminary needs to compute one by one the following elements $$CUR_1^{d(*)-1}, CUR_1^{d(*)-2}, \ldots, CUR_1. \tag{28}$$

Assume, first, that during the computation of a ciphertext no changing indices procedure has been applied.

Let's present the expression for calculation of $CUR_1^{d(*)}$, $d \geq 2$. After adaptation of formula (4) presented in section "Iterated transformations" of the invention to the transformation of a degree d and using elements (26) with the corresponding notation, it is possible to write $$CUR_1^{d(*)} = CUR_1^{d(*)-1} \oplus$$
$$\oplus \phi_f^{d(*)}(\delta^{(int(CURR_v^{d(*)-1})+L_v^{d(*)}(int(CURR_v^{d(*)-1}),2^n)) \bmod 2^n}) \oplus$$
$$\oplus \phi_g^{d(*)}(\beta^{(int(CURR_v^{d(*)})+L_v^{d(*)-1}(int(CURR_v^{d(*)}),2^n)) \bmod 2^n}) \tag{29}$$

As elements $CURR_v^{d(*)-1}, CURR_v^{d(*)}$ and collections $L_v^{d(*)}$, $L_v^{d(*)-1}$ are known (as they have been generated during processing a key K), it is possible to calculate $CUR_1^{d(*)-1}$ $$CUR_1^{d(*)-1} = CUR_1^{d(*)} \oplus$$
$$\oplus \phi_f^{d(*)}(\delta^{(int(CURR_v^{d(*)-1})+L_v^{d(*)}(int(CURR_v^{d(*)-1}),2^n)) \bmod 2^n}) \oplus$$
$$\oplus \phi_g^{d(*)}(\beta^{(int(CURR_v^{d(*)})+L_v^{d(*)-1}(int(CURR_v^{d(*)}),2^n)) \bmod 2^n}). \tag{30}$$

Having $CUR_1^{d(*)-1}$ computed it is possible to compute $CUR_1^{d(*)-2}$. Indeed, as $$CUR_1^{d(*)} = CUR_1^{d(*)-2} \oplus$$
$$\oplus \phi_f^{d(*)-1}(\delta^{(int(CURR_v^{d(*)-2})+L_v^{d(*)-1}(int(CURR_v^{d(*)-2}),2^n)) \bmod 2^n}) \oplus$$
$$\oplus \phi_g^{d(*)-1}(\beta^{(int(CURR_v^{d(*)-1})+L_v^{d(*)-2}(int(CURR_v^{d(*)-1}),2^n)) \bmod 2^n}) \tag{31}$$

it is possible to get $$CUR_1^{d(*)-2} = CUR_1^{d(*)-1} \oplus$$
$$\oplus \phi_f^{d(*)-1}(\delta^{(int(CURR_v^{d(*)-2})+L_v^{d(*)-1}(int(CURR_v^{d(*)-2}),2^n)) \bmod 2^n}) \oplus$$
$$\oplus \phi_g^{d(*)-1}(\beta^{(int(CURR_v^{d(*)-1})+L_v^{d(*)-2}(int(CURR_v^{d(*)-1}),2^n)) \bmod 2^n}). \tag{32}$$

Continuing the process of calculation of elements $CUR_1^{d(*)-3}, \ldots, CUR_1$ it is possible to compute the first n-bit word of $K_{rf}\|M$ that we denote by $M_1$. Indeed, assume that $CUR_1$ is calculated, that is, $$CUR_1 = M_1 \oplus \phi_f(\delta^{(int(W_l)+L_v(int(W_v),2^n)) \bmod 2^n}) \oplus$$
$$\oplus \phi_g(\beta^{(int(CURR_v)+V_v(int(CURR_v),2^n)) \bmod 2^n}). \tag{33}$$

As elements $W_v, CURR_v$, and collections $L_v, V_v$, have been calculated during processing a key K, it may be possible to obtain $M_1$ by $$M_1 = CUR_1 \oplus \phi_f(\delta^{(int(W_v)+L_v(int(W_v),2^n)) \bmod 2^n}) \oplus$$
$$\oplus \phi_g(\beta^{(int(CURR_v)+v_l(int(CURR_v),2^n)) \bmod 2^n}). \tag{34}$$

The gradual computation of elements $$CUR_1^{d(*)-1}, CUR_1^{d(*)-2}, \ldots, CUR_1, M_1 \tag{35}$$

presented above allows performing gradual updating collections (27). Indeed, it may be possible to start with $L_v^{d(*)}$. Element $CUR_1^{d(*)}$ is known (it is the first element of a ciphertext), so it is) possible to generate $L_{v+1}^{d(*)}$ by $$L_{v+1}^{d(*)} = Sub(L_v^{d(*)}, int(CUR_1^{d(*)})). \tag{36}$$

In the same, way after gradual calculation of $CUR_1^{d(*)-1}$, $CUR_1^{d(*)-2}, \ldots, CUR_1, M_1$ it is possible gradually computing $$L_{v+1}^{d(*)-1} = Sub(L_v^{d(*)-1}, int(CUR_1^{d(*)-1})), \tag{37}$$
$$L_{v+1}^{d(*)-2} = Sub(L_v^{d(*)-2}, int(CUR_1^{d(*)-2})),$$
$$\ldots$$
$$L^*_{v+1} = Sub(L^*_v, int(CUR^*_1)),$$
$$L_{v+1} = Sub(L_v, int(CUR_1)),$$
$$V_{v+1} = Sub(V_v, int(M_1)).$$

Thus, collections $$L_{v+1}^{d(*)}, L_{v+1}^{d(*)-1}, L_{v+1}^{d(*)-2}, \ldots, L_{v+1}, V_{v+1} \tag{38}$$

are prepared.

In an embodiment of the present invention it may be emphasized that bit strings (19) may also be gradually updated upon obtaining element $CUR_1^{d(*)}$ and gradual calculation of elements $CUR_1^{d(*)-1}, CUR_1^{d(*)-2}, \ldots, CUR_1, M_1$.

Having computed elements (35) and collections (38) it may be possible to start the process of computation that leads to obtaining the second element, that is n-bit word $M_2$ of the splitting with jumping procedure of a subsequence $K_{rf}\|M$ of a sequence $K\|M\|BS$. The process of obtaining element $M_2$ may be performed in the same way as the process of computing element $M_1$ described above. It may be possible again to start with obtaining the second n-bit words from a ciphertext, that is, element $CUR_2^{d(*)}$. Then noting that expression for $CUR_2^{d(*)}$ may be written as $$CUR_2^{d(*)} = CUR_2^{d(*)-1} \oplus$$

$$\oplus \phi_f(\delta^{(int(CUR_1^{d(*)-1})+L_{v+1}^{d(*)}(int(CUR_1^{d(*)-1}),2^n)) \bmod 2^n}) \oplus$$

$$\oplus \phi_g^{d(*)}(\beta^{(int(CUR_1^{d(*)})+L_{v+1}^{d(*)-1}(int(CUR_1^{d(*)}),2^n)) \bmod 2^n}), \quad (39)$$

it may be possible to get $CUR_2^{d(*)-1}$ by $$CUR_2^{d(*)-1} = CUR_2^{d(*)} \oplus$$

$$\oplus \phi_f(\delta^{(int(CUR_1^{d(*)-1})+L_{v+1}^{d(*)}(int(CUR_1^{d(*)-1}),2^n)) \bmod 2^n}) \oplus$$

$$\oplus \phi_g^{d(*)}(\beta^{(int(CUR_1^{d(*)})+L_{v+1}^{d(*)-1}(int(CUR_1^{d(*)}),2^n)) \bmod 2^n}). \quad (40)$$

Continuing the process of the calculation of elements $CUR_2^{d(*)-2}, \ldots, CUR_2$ may be eventually possible to obtain $M_2$. Indeed, since $$CUR_2 = M_2 \oplus \phi_f(\delta^{(int(M_1)+L_{v+1}(int(M_1),2^n)) \bmod 2^n}) \oplus$$

$$\oplus \phi_g(\beta^{(int(CUR_1)+V_{v+1}(int(CUR_1),2^n)) \bmod 2^n}) \quad (41)$$

it may be possible to get $$M_2 = CUR_2 \oplus \phi_f(\delta^{(int(M_1)+L_{v+1}(int(M_1),2^n)) \bmod 2^n}) \oplus$$

$$\oplus \phi_g(\beta^{(int(CUR_1)+V_{v+1}(int(CUR_1),2^n)) \bmod 2^n}). \quad (42)$$

Once again, the gradual computation of elements $$CUR_2^{d(*)}, CUR_2^{d(*)-1}, CUR_2^{d(*)-2}, \ldots, CUR_2, M_2 \quad (43)$$

allows generate $$L_{v+2}^{d(*)}, L_{v+2}^{d(*)-1}, L_{v+2}^{d(*)-2}, \ldots, L_{v+2}, V_{v+2} \quad (44)$$

by computing gradually $$L_{v+2}^{d(*)} = Sub(L_{v+1}^{d(*)}, CUR_2^{d(*)}),$$
$$L_{v+2}^{d(*)-1} = Sub(L_{v+1}^{d(*)-1}, CUR_2^{d(*)-1}),$$
$$L_{v+2}^{d(*)-2} = Sub(L_{v+1}^{d(*)-2}, CUR_2^{d(*)-2}),$$
$$\ldots$$
$$L_{v+2}^* = Sub(L_{v+1}^*, CUR_2^*),$$
$$L_{v+2} = Sub(L_{v+1}, int(CUR_2)),$$
$$V_{v+2} = Sub(V_{v+1}, int(M_2)). \quad (45)$$

It is important to note that bit strings (19) may be gradually updated upon obtaining elements (43).

Having computed elements (43) and collections (44) it may be possible to start calculating the third element $M_3$, that is, the third n-bit word of the splitting with jumping procedure of a subsequence $K_{rf} \| M$ of a sequence $K \| M$ using the same methodology used above, by means of which elements $M_1$ and $M_2$ were computed. Indeed, the third n-bit word, that is, an element $CUR_3^{d(*)}$ may be extracted from a ciphertext (25). Then $CUR_3^{d(*)-1}$ may be computed by $$CUR_3^{d(*)-1} = CUR_3^{d(*)} \oplus$$

$$\oplus \phi_f^{d(*)}(\delta^{(int(CUR_2^{d(*)-1})+L_{v+2}^{d(*)}(int(CUR_2^{d(*)-1}),2^n)) \bmod 2^n}) \oplus$$

$$\oplus \phi_g^{d(*)}(\beta^{(int(CUR_2^{d(*)})+L_{v+2}^{d(*)-1}(int(CUR_2^{d(*)}),2^n)) \bmod 2^n}). \quad (46)$$

After that elements $$CUR_3^{d(*)-2}, \ldots, CUR_3$$

may be gradually calculated. And eventually $M_3$ may be obtained in accordance with $$M_3 = CUR_3 \oplus \phi_f(\delta^{(int(M_2)+L_{v+2}(int(M_2),2^n)) \bmod 2^n}) \oplus$$

$$\oplus \phi_g(\beta^{(int(CUR_2)+V_{v+2}(int(CUR_2),2^n)) \bmod 2^n}).$$

Collections $$L_{v+3}^{d(*)}, L_{v+3}^{d(*)-1}, L_{v+3}^{d(*)-2}, \ldots, L_{v+3}, V_{v+3}$$

may be gradually formed and bit strings (19) may be gradually updated.

Thus, the process of computing elements $M_4, M_5, \ldots$ may be continued up to the moment when the last element $CUR_{T_j}^{d(*)}$ of a ciphertext (25) is processed.

It may be stressed that using two last bytes LB of a ciphertext, numbers rf, rs, rt and a length s of a padding sequence of bits that was added to a sequence (25') may be obtained. This why the last bit of $CUR_{T_j}^{d(*)}$ will be the 16+s+1-th bit from the end of a ciphertext (25).

In an embodiment of the present invention a procedure of retrieving a plaintext from a collection of elements $M_1$, $M_2, \ldots$ obtained during the decryption procedure described above may be presented.

Assume that a collection of elements $M_1, M_2, \ldots$ is obtained. Taking into account that a splitting with jumping procedure has been used during generating a ciphertext, it may be not possible to obtain a plaintext by $$M_1 \| M_2 \| M_3 \| \ldots, \quad (47)$$

as different elements $M_1, M_2, M_3, \ldots$ may be "overlapped", that is, may contain common parts of a sequence of bits consisting of a plaintext and BS. However it may be noted that if the splitting with maximum jumping procedure was applied during an encryption of a message M and the length of a chosen key is chosen in accordance with the scheme considered in section "Choosing the size of a key" and presented above, then rf=0 and a plaintext may be obtained by (47), though it may be still necessary to separate a plaintext and BS. It can be done naturally, as the length of BS is known (the lengths of all the bit strings are known and the method of forming BS is also known), parameters rs and rt may be obtained from LB. Therefore in this case a plaintext is a sequence of bits (47) the first bit of which is the first bit of $M_1$ and the last bit of a plaintext is the (length(BS)−rt+1)-th bit of sequence (47) from the end, where length(BS) is the number of bits of a sequence BS (the size of LB 16 bits is not considered, as it is an informational part of a ciphertext).

In the case, when $q_1, q_2, q_3, \ldots$ are different, a plaintext may be also extracted from (47). We may start with $M_1$. As $q_i$, i=1, ... may be different from n it means that rf may be different from 0, and in this case the first bit of a plaintext begins with the rf+1-th bit of $M_1$. Denote the part of an n-bit word $M_1$ starting from the rf+1-th bit of $M_1$ to up to the last, that is, n-th bit of $M_1$ by $Pt_1$. Next, in accordance with the splitting with jumping procedure presented above, $q_{v+1}$ may be computed, and when the computation of $M_2$ is completed, another portion of a plaintext may be recovered. Taking into account that the first $n-q_{v+1}$ bits of an n-bit word $M_2$ are "overlapped" with the last $n-q_{v+1}$ bits of $M_1$, it is possible to obtain $$Pt_2 = Pt_1 \| lb_{q_{v+1}}(M_2), \quad (48)$$

where by $lb_{q_{v+1}}(M_2)$ we denoted the last $q_{v+1}$ bits of $M_2$ and $Pt_2$ denotes a part of a plaintext recovered from $M_1$ and $M_2$.

Then, it may be possible to calculate $q_{v+2}$ and after the calculation $M_3$ it is possible to continue the process of restoring the plaintext by concatenating $Pt_2$ and $q_{v+2}$ last bits of $M_3$, that is $$Pt_3 = Pt_2 \| lb_{q_{v+2}}(M_3), \qquad (49)$$

where by $lb_{q_{v+2}}(M_3)$ the last $q_{j+1}$ bits of $M_3$ are denoted. It may be possible to continue the described above process of restoring a sequence of bits $K_{rt} \| M \| BS$ for any $M_j$, $j>3$ and the corresponding $q_{v+j-1}$ by $$Pt_j = Pt_{j-1} \| lb_{q_{v+j-1}}(M_j) \qquad (50)$$

up to the moment when the last element of a ciphertext $CUR_{T_j}^{d(*)}$ is processed. The sequence of bits $Pt_m$ that will be obtained after processing $CUR_{T_j}^{d(*)}$ will be, in fact, a sequence $M \| BS(rt)$, where by $BS(rt)$ we denote a sequence $BS$ without last $rt$ bits. We remind that the last two bytes of a ciphertext, that is, LB is an informational part of a ciphertext and it is not processed.

After restoring a sequence $M \| BS(rt)$ it may be possible, at last, to obtain a message M. Indeed, as the length of BS is known and parameter $rt$ is also known, the last bit of a message M will be the length(BS)−$rt$+1-th bit of a sequence $M \| BS(rt)$ from the end, where by length(BS) we denote a number of bits of a sequence BS.

It may be noted that the process of restoring a collection $M \| BS(rt)$, that is the process of gradual computation of $Pt_1$, $Pt_2$, $Pt_3$, ..., $Pt_m$ presented above may be realized gradually upon computing elements $M_1$, $M_2$, $M_3$, ..., that is, the process of decryption may also be organized as a stream process.

4. The Orange Cipher with an Iterated Transformation without Filters with Applying a Changing Indices Procedure In an embodiment of the present invention applying a changing indices procedure in the Orange cipher without filters may be presented. Applying the changing indices procedure in the Orange cipher allows, in particular, speeding up both—software and hardware implementations of computing transformations of various degrees. On the other hand, applying the changing indices procedure making the analysis of possibilities to attack the cipher more complicated, as transformations of different degrees should be analyzed "individually" and, therefore, no general scheme of analysis will be possible to apply to all transformations.

If the changing indices procedure that was presented above is applied, then vectors (14), that is, vectors $$ADF, ADS, ADT, ADL, ADV, \ldots, ADF^{d(*)}, ADS^{d(*)}, ADT^{d(*)}, ADL^{d(*)},$$

containing, respectively, $$b_1, b_2, b_3, b_4, b_5, b_6, \ldots, b_1^{d(*)}, b_2^{d(*)}, b_3^{d(*)}, b_4^{d(*)}, b_5^{d(*)}$$

polynomials of degrees less than n may be specified. When vectors (14) are specified in a framework of the encryption procedure presented above, it may be necessary to apply expressions for calculating elements of collections CUR, ..., $CUR^{d(*)}$, $d \geq 2$ in accordance with the procedure presented in "Changing indices" section of the present invention. The main steps of the encryption procedure—a key processing, the first and the second stages of the generation of a ciphertext of a message M, are not changed.

If the changing indices procedure is applied during encrypting a message, the corresponding expressions (with specified vectors (14)) should also be applied for calculating elements of collections $CUR^{d(*)}$, $CUR^{d(*)-1}$, ..., CUR, $d \geq 2$ during decrypting a ciphertext. In particular, expressions (29-34) and (39-42) presented above may be modified and the modification depends on the specified vectors (14), while the whole process of decryption is not changed.

5. Example I

In an embodiment of the present invention it is possible to present an example of IV (initial values) of the presented above encryption construction.

It may be possible to set a degree of splitting n=5, which means that in accordance with the choosing the size of a key procedure presented above, a key of 160 bits should be used.

a. Splitting with Jumping Parameters

It may be possible to choose a splitting with jumping scheme II with the following Spl table 4,5,2,5,3,1,5,5,4,3,2,4,4,5,4,5,3,1,5,4,3,4,5,5,4,3,3,5,5, 4,4,5,5,2,4,3,4,5,5.

It may be also possible to set $q_1=q_2=q_3=q_4=1$ and for any $i>4$ $q_i$ may be define in accordance with procedure presented in section "Splitting with jumping II" for $$\omega_i = int(CUR^*_{i-3} \oplus \overline{CUR_{i-4}{}^3}).$$

b. Iterated Transformation Parameters

It may be possible, next to choose an iterated transformation of degree 6 (that is, d=6) with the following parameters:

$$f(x)=x^5+x^2+1, \; g(x)=x^5+x^4+x^3+x+1,$$

$$\delta=x^4+x+1, \; \beta=x^3+x^2+x+1,$$

$$f^*(x)=x^5+x^4+x^2+x+1, \; g^*(x)=x^5+x^3+x^2+x+1.$$

$$\delta^*=x^2+x+1, \; \beta^*=x+1.$$

We set $$f^*(x)=f^{**}(x)=f^{3(*)}(x)=f^{4(*)}(x)=f^{5(*)}(x)=g^{6(*)}(x),$$

$$g^*(x)=g^{**}(x)=g^{3(*)}(x)=g^{4(*)}(x)=g^{5(*)}(x)=f^{6(*)}(x)$$

and $$\delta^*=\beta^{**}=\beta^{3(*)}=\beta^{4(*)}=\beta^{5(*)}=\delta^{6(*)},$$

$$\beta^*=\delta^{**}=\delta^{3(*)}=\delta^{4(*)}=\delta^{5(*)}=\beta^{6(*)}.$$

All isomorphisms $\phi_f, \phi_{f^*}, \ldots, \phi_{f^{6(*)}}, \phi_g, \phi_{g^*}, \ldots, \phi_{g^{6(*)}}$ are trivial, that is, for any polynomial of degree less than 5

$$a_0+a_1x+a_2x^2+a_3x^3+a_4x^4$$

there takes place $$\phi_j(a_0+a_1x+a_2x^2+a_3x^3+a_4x^4)=<a_0 a_1 a_2 a_3 a_4>,$$

where j=f, f*, f**, ..., $f^{6(*)}$, g, g*, g**, ..., $g^{6(*)}$, $a_i \in F_2$, i=0, ..., 4 and $<a_0 a_1 a_2 a_3 a_4>$ is a vector of a vector space $F_2^5$. Then, we may, for instance, set $L_0$—25,7,4,6,18,23,24,13,15,9,10,28,21,30,20,8,19,2, 29,27,31,0,11,14,1,5,12,17,16,22,26,3, $V_0$—7,19,5,6,17,29,16,4,31,28,10,24,8,9,23,27,2,20, 21,0,30,12,25,18,1,26,11,13,22,14,15,3, $L^*_0$—2,12,5,31,17,20,10,11,7,9,29,25,13,14,4,28,19, 6,21,17,18,15,0,26,3,19,13,27,16,22,5,30, $L^{**}_0$—26,19,5,9,0,18,1,2,16,22,21,23,30,17,31,24,15, 28,4,3,25,7,8,14,27,29,13,10,6,11,20,12, $L_0^{3(*)}$—8,14,16,2,5,6,21,26,1,25,19,29,15,7,12,10,28, 27,22,0,30,24,13,3,9,20,31,17,23,18,11,4, $L_0^{4(*)}$—3,31,9,15,2,27,25,21,18,10,4,5,0,1,19,17,25, 29,6,23,30,16,26,13,14,12,31,20,24,8,2,7, $L_0^{5(*)}$—29,7,22,1,27,24,0,19,17,16,3,12,5,18,15,23, 14,13,6,4,30,2,10,31,9,25,20,11,8,28,21,26

$L_0^{6(*)}$—4,18,9,28,8,11,27,23,10,7,2,19,7,26,25,26,24, 13,20,0,11,21,30,17,12,29,15,7,16,31,3,11.

and $t_1=5$, $t_2=17$, $t^*_1=15$, $t^*_2=3$, $t^{}_1=0$, $t^{}_2=28$, $t_1^{3(*)}=t_1^{4(*)}=t_1^{5(*)}=3$, $t_2^{3(*)}=t_2^{4(*)}=t_2^{5(*)}=21$, $t_1^{6(*)}=t_2^{6(*)}=11$.

c. Bit Strings Parameters

It may be possible, for instance, set one bit string $\epsilon^{}$ for CUR and two bit strings $\epsilon_1^{4(*)}$, $\epsilon_2^{4(*)}$ with $S_1^{4(*)}$ and $S_2^{4(*)}$, correspondingly, for $CUR^{4(*)}$, where $S_1^{4(*)}=\{14,18,9,28,8,22,27,23,10,4,2,19,7,26,24,13, 20\}$, $S_2^{4(*)}=\{0,11,21,30,17,12,29,15,5,16,31,3,1,6,25\}$.

The sizes of all the bit strings are equal and are 200 bits. The bit strings will be updated in accordance with the procedure "Forming the bit strings II" presented above. We may set $\Delta^{**}$—(4,6,2,7,3,5,1,3,4,8,1,6,3,7,5,4,3,1,2,1,7,9,4,5,2, 3,6,1,7,8,4,1,2,2,6,3,1), $\Delta_1^{4(*)}$—(5,3,6,5,8,5,7,9,6,9,5,7,4,5,9,7,6,8,2,7,1,9,5,3, 6,7,8,4,6,9,3,8,7,5,3,9,9,4,8,5,8,9,5,5,4), $\Delta_2^{4(*)}$—(6,1,7,3,6,5,2,7,7,1,3,4,6,5,1,2,6,3,1,4,1,9,8,5, 2,2,4,1,3,9,5,6,7,6).

II. The Orange Family of Stream Ciphers with Filters

In an embodiment of the present invention a family of stream ciphers with applying keystreams generated during computing a ciphertext may be presented. The constantly updated bit strings are used as the keystreams. As the number of generated bit strings may be parameterized, so the number of the keystreams may also be parameterized. In an embodiment of the present invention a few schemes of applying the keystreams may be presented.

F. Encryption with Filters

In an embodiment of the present invention a method of computing a ciphertext for a message M and a key K with using keystreams may be presented. We will refer the scheme to as an encryption with filters.

In a framework of the encryption with filters the encryption procedure may also be started with applying a splitting with jumping procedure, an iterated transformation procedure and forming the bit strings procedure; however the iterated transformation procedure is modified, as the bit strings are involved in the iterated transformation procedure.

1. Filters

In an embodiment of the present invention applying a splitting with jumping procedure to a bit string may be presented. By applying a splitting with jumping procedure to a bit string and generating a collection of the corresponding n-bit words it may be possible to generate elements of a keystream that will be used in an iterated transformations procedure considered below.

Let $\epsilon$ be a bit string of length $\sigma$ and fix some degree of a splitting with jumping n such that $4 \leq n \leq 10$. The corresponding $q_1$, $q_2$, $q_3$, ... may be generated and a splitting with jumping procedure may be applied to $\epsilon$ in accordance with the presented above procedure. The obtained n-bit words may be denoted by $\epsilon(1,n)$, $\epsilon(2,n)$, $\epsilon(3,n)$, ... and assume that that for some $i>0$ $\epsilon(i,n)$ is the last an n-bit word containing n bits of $\epsilon$, that is, there is not enough bits in remaining part of $\epsilon$ to form another n-bit word. A procedure of generating $\epsilon(i+1,n)$ in this case may be presented. Denote by $\epsilon_l(i+1)$ a collection of remaining bits of $\epsilon$ that will be included into $\epsilon(i+1,n)$, and denote by length($\epsilon_l(i+1)$) a number of bits in $\epsilon_l(i+1)$. It may be noted that $0 \leq \text{length}(\epsilon_l(i+1)) < n$. Further, denote by $\epsilon_f(i+1)$ an (n−length($\epsilon_l(i+1)$))-bit word formed from the first (n−length ($\epsilon_l(i+1)$)) bits of $\epsilon$. Then it may be possible to define $\epsilon(i+1,n)$ by $\epsilon(i+1,n)=\epsilon_l(i+1)\|\epsilon_f(i+1)$, where $\|$ is an operation of concatenation of two sequences of bits. After that it may be possible to keep generating elements $\epsilon(i+2,n)$, $\epsilon(i+3,n)$, and so forth. The presented above procedure of applying a splitting with jumping to a bit string $\epsilon$ may be interpreted in the following way. Every time when in the result of applying a splitting with jumping procedure to $\epsilon$ we are "out of bits" of a bit string $\epsilon$, it is always possible to move to the beginning of the bit string and add the needed number of bits starting from the beginning of $\epsilon$ in order to complete forming an n-bit word. The process of generating the next n-bit word is naturally continued keeping in mind the move to the beginning of a bit string. However, it is important to notice that bit string $\epsilon$ may be constantly updated.

Thus, it may be possible to generate any number of n-bit words applying a splitting with jumping procedure presented above.

In an embodiment of the present invention a method of applying a backward splitting with jumping procedure to a bit string $\epsilon$ may be considered.

Let a be any collection of bits. Denote by Op(a) a collection of bits that may be obtained by inverting a collection a. For example, if a is a sequence of bits

011010001110101, where 0 is the first bit, 1 is the second bit and so forth, then Op(a) is the following collection of bits

101011100010110.

A backward splitting with jumping procedure applied to a bit string $\epsilon$ is a splitting with jumping procedure applied to Op($\epsilon$).

In an embodiment of the present invention any function defined on a collection of elements (iv) or (v) (see section "Splitting with jumping") may be used to generate $q_1$, $q_2$, $q_3$, ... and any corresponding mapping $\phi:\{0, 1, \ldots, 2^n-1\} \to \{1, \ldots, n\}$ may be considered if the Splitting with jumping procedure I presented above is applied, or any Spl table may be defined if the Splitting with jumping procedure II presented above is applied.

Thus, in general, more than one splitting with jumping procedures, or more than one backward splitting with jumping procedures may be applied to one and the same bit string $\epsilon$. If $q_1=q_2=q_3=\ldots=n$ we may say that a splitting with maximum jumping is applied to a bit string $\epsilon$.

The bit strings, to which splitting with jumping procedures are applied will be referred to as filters and the bit strings, to which backwards splitting with jumping procedures are applied will be referred to as reverse filters, or a filter in reverse order. If $\epsilon$ is a filter, that is, a bit string with applied splitting with jumping procedure then elements $\epsilon(1,n)$, $\epsilon(2,n)$, $\epsilon(3,n)$, ... will be referred to as the first, second and so forth elements of a filter $\epsilon$. If $\epsilon$ is a bit string, then the reverse filter based on $\epsilon$ will be denoted by $\epsilon^{-1}$ and the elements of the reverse filter will be denoted by $\epsilon^{-1}(1,n)$, $\epsilon^{-1}(2,n)$, $\epsilon^{-1}(3,n)$, ....

If no splitting with jumping procedure is specified to a bit string, it may be possible to consider that, by default, a splitting with maximum jumping is applied to the bit string in the case when it is considered as a filter.

2. Continuation of Example I

In a framework of the Continuation of Example I parameters of two splitting with jumping procedures applied to a bit string $\epsilon^{**}$ are presented. Therefore the parameters of the splitting with jumping procedure (applied to a message) and iterated transformation parameters in the Continuation of Example I will be the same as in Example I; however a section c ("Bit string parameters") is changed. The updated c section is presented below.

c'. Bit Strings Parameters

We may set one bit string $\epsilon^{}$ for $CUR^{}$ and two bit strings $\epsilon_1^{4(*)}$, $\epsilon_2^{4(*)}$ with $S_1^{4(*)}$ and $S_2^{4(*)}$, correspondingly, for $CUR^{4(*)}$, where $S_1^{4(*)} = \{14,18,9,28,8,22,27,23,10,4,2,19,7,26,24\}$, $S_2^{4(*)} = \{0,11,21,30,17,12,29,15,5,16,31,3,1,6,25,20,13\}$.

The sizes of all the bit strings are equal and are 200 bits. The bit strings will be updated in accordance with the procedure "Forming the bit strings II" presented above. It may be possible to define $\Delta^{**}$—(10,6,9,12,3,5,6,3,9,5,12,6,3,10,5,12,3,6,10,9,5, 9,9,5,10,3,6,12,9,3,5,6,3,10,12,5,11,3), $\Delta_1^{4(*)}$—(5,3,6,5,8,5,7,9,6,9,5,7,4,5,9,7,6,8,2,7,1,9,5,3, 6,7,8,4,6,9,3,8,7,5,3,9,9,4,8,5,8,9,5,5,4), $\Delta_2^{4(*)}$—(6,1,7,3,6,5,2,7,7,1,3,4,6,5,1,2,6,3,1,4,1,9,8,5, 2,2,4,1,3,9,5,6,7,6).

Then, a splitting with jumping scheme II with $Spl_1$ table 4,5,2,5,3,1,5,5,4,3,2,4,4,5,4,5,3,1,5,4,3,4,5,5,4,3,3,5,5, 4,4,5,5,2,4,3,4,5,5 for filter $\epsilon^{**}$ and a backward splitting with jumping scheme with $Spl_2$ table 4,1,3,2,5,3,1,4,5,4,3,2,4,1,3,4,5,3,1,4,5,3,2,5,1,4,2,3,1, 5,4,3,5,4,2,5,4,3,1,5,2,2,1,4,3,5 for reverse filter $(\epsilon^{**})^{-1}$ are prepared.

Additionally, $\omega'$ and $\omega''$ need to be defined for computing splitting periods for $\epsilon^{}$ and $(\epsilon^{})^{-1}$, correspondingly. It may be possible to set $q_1 = q_2 = q_3 = q_4 = 1$ and for any $i>4$ $q_i$ may be define in accordance with procedure presented in section "Splitting with jumping II" for $\omega'_i$ and $\omega''_i$ defined, for instance, in accordance with $\omega'_i = int(\overline{CUR_{i-1} \oplus CUR^{**}_{i-3}})$ and $\omega''_i = \overline{(CUR^*_{i-1} \oplus CUR_{i-4}^{4(*)})}$.

3. Iterated Transformations with Direct Filters

An iterated transformation with direct filters procedure involves filters and reverse filters that are formed based on bit strings. Assume that some degree of splitting with jumping $4 \leq n \leq 10$ and a degree $d \geq 2$ of an iterated transformation are chosen. Assume, further that $Sub(2^n,m_0)$, $Sub^*(2^n,m_1)$, ..., $Sub^{d(*)}(2^n,m_{d(*)})$ and the collections of bit strings $e_1, \ldots, e_{m_0}, e^*_1, \ldots, e^*_{m_1}, \ldots, e_1^{d(*)}, \ldots, e_{m_{d(*)}}^{d(*)}$ with sizes $\sigma_1, \ldots, \sigma_{m_0}, \sigma^*_1, \ldots, \sigma^*_{m_1}, \ldots, \sigma_1^{d(*)}, \ldots, \sigma_{m_{d(*)}}^{d(*)}$, respectively, for the elements of collections $CUR$, $CUR^*, \ldots, CUR^{d(*)}$, correspondingly, are prepared. Assume, at last, that a collection of ordered sets of non-zero integers $\Delta_{i_0}, \Delta^*_{i_1}, \ldots, \Delta_{i_{d(*)}}^{d(*)}$ containing $pw_{i_0}, pw^*_{i_1}, \ldots, pw_{i_{d(*)}}^{d(*)}$ non zero integers, respectively, $i_0 = 1, \ldots, m_0$, $i_1 = 1, \ldots, m_1, \ldots, i_{d(*)} = 1, \ldots, m_{d(*)}$ is also prepared.

It may be noted that empty set of the bit strings may be associated to some of the collections $CUR, CUR^*, \ldots, CUR^{d(*)}$. (51)

Eventually, collections (13), pairs of irreducible polynomials (13'), pairs of generators (13") and isomorphisms of vector spaces (13''') may be specified.

Before starting a modified computation of elements of collections $CUR, CUR^*, \ldots, CUR^{d(*)}$ in a framework of an iterated transformation with direct filters a special table of filters Dfl may be prepared. The table contains pairs $(i[u],j)$, $i > j$ that specify a collection $CUR^{i(*)}$, the u-th filter of which will be used during the computation of elements of a collection $CUR^{j(*)}$, $i,j = 0, 1, \ldots, d$. The table may also contain pairs $(i^{-1}[u],j)$, $i > j$ for $i,j = 0, 1, \ldots, d$. This means that the u-th reverse filter (that is, the u-th bit string associated with a collection $CUR^{i(*)}$ with applied backward splitting with jumping procedure) will be used during the computation of elements of a collection $CUR^{j(*)}$.

Without losing generality it may be possible to consider the presentation of an iterated transformation with direct filters based on the Continuation to Example I presented above. It may be possible to start, for instance, with the following Dfl table $(2,3),(4[1],5),(4^{-1}[2],6)$. (52)

It means that a filter $\epsilon^{**}$ with applied splitting with jumping procedure will be used when the computation of elements of $CUR^{3(*)}$ takes place, and filters $\epsilon_1^{4(*)}$, $\epsilon_2^{4(*)}$ will be used when the computation of elements of collections $CUR^{5(*)}$ and $CUR^{6(*)}$, correspondingly, takes place. Moreover, a reverse filter $\epsilon_2^{4(*)}$ with applied backward splitting with jumping procedure will be used during the computation of elements of a collection $CUR^{6(*)}$. Again, it may be possible to remind that if no splitting with jumping is specified to any bit string, then, by default a splitting with maximum jumping is applied to any bit string considered as a filter.

Let, further, R be any sequence of bits that should be processed. First, a splitting with jumping procedure may be applied to R and then an iterated transformation procedure with direct filters may be presented. The computation of the elements of collections $CUR$, $CUR^*$ and $CUR^{**}$ is the same as it was described in section "Iterated transformations"; however the computation of the elements of $CUR^{3(*)}$ is different and may be realized by $$CUR_1^{3(*)} = (CUR^{}_1 \oplus \epsilon^{}(1,5)) \\ \oplus \phi_f{3(*)}(\delta^{(t_1^{3(*)}+L_0^{3(*)}(t_1^{3(*)}),2^5))\bmod 2^5}) \oplus$$

$$\oplus \phi_g{3(*)}(\beta^{(t_2^{3(*)}+L^{**}_0(t_2^{3(*)}),2^5))\bmod 2^5}) \quad (53)$$

for the corresponding $1 \le t_1^{3(*)} \le 2^5-1$ and $1 \le t_2^{3(*)} \le 2^5-1$ and for $L^{}_0$ that was used for the computing $CUR^{}_1$. Here $\epsilon^{}(1,5)$ is the first elements of a filter $\epsilon^{}$.

Then it is possible to compute $L_1^{3(*)} = Sub(L_0^{3(*)}, int(CUR_1^{3(*)}))$ and the next element $\epsilon^{}(2,5)$ of a filter $\epsilon^{}$, and calculate $$CUR_2^{3(*)} =$$

$$= (CUR^{}_2 \oplus \epsilon^{}(2,5)) \\ \oplus \phi_f{3(*)}(\delta^{(int(CUR^{**}_1)+L_1^{3(*)}(int(CUR^{*}_1),2^5))\bmod 2^5}) \oplus$$

$$\oplus \phi_g{3(*)}(\beta^{(int(CUR_1^{3(*)})+L^{**}_1(int(CUR_1^{3(*)}),2^5))\bmod 2^5}). \quad (54)$$

Thus, for any $i>2$ and $L_{i-1}^{3(*)}=Sub(L_{i-2}^{3(*)}, int(CUR_{i-1}^{3(*)}))$ it may be possible to calculate $$CUR_i^{3(*)} =$$

$$= (CUR^{}_i \oplus \epsilon^{}(i,5)) \oplus \phi_f{3(*)} \\ (\delta^{(int(CUR^{**}_{i-1})+L_{i-1}^{3(*)}(int(CUR^{*}_{i-1}),2^5))\bmod 2^5}) \oplus$$

$$\oplus \phi_g{3(*)}(\beta^{(int(CUR_{i-1}^{3(*)})+L^{**}_{i-1}(int(CUR_{i-1}^{3(*)}),2^5))\bmod 2^5}). \quad (55)$$

It may be noted that $L^{}_0$, $L^{}_1$ in expressions (53), (54), correspondingly, and $L^{}_i$ in (55) are ordered collections of integers that arise during the process of computing the elements of $CUR^{}$. It may be also noted that $\epsilon^{}(1,5)$, $\epsilon^{}(2,5)$, ... are the corresponding elements of a filter $\epsilon^{**}$.

Next, the elements of $CUR^{4(*)}$ are computed in accordance with the procedure described in section "Iterated transformations" presented above, that is, the elements are computed without involving any filters; however the elements of $CUR^{5(*)}$ are computed with involving elements $\epsilon_1^{4(*)}(i,5)$ of a filter $\epsilon_1^{4(*)}$, $i=1, 2, \ldots$, that is, $$CUR_1^{5(*)} = (CUR_1^{4(*)} \oplus \epsilon_1^{4(*)}(1,5)) \oplus \phi_f{5(*)} \\ (\delta^{(t_1^{5(*)}+L_0^{5(*)}(t_1^{5(*)}),2^5))\bmod 2^5}) \oplus$$

$$\oplus \phi_g{5(*)}(\beta^{(t_2^{5(*)}+L_0^{4(*)}(t_2^{5(*)}),2^5))\bmod 2^5}) \quad (56)$$

for the corresponding $1 \le t_1^{5(*)} \le 2^5-1$, $1 \le t_2^{5(*)} \le 2^5-1$ and for $L_0^{4(*)}$ that was used for computing $CUR_1^{4(*)}$. Thus, for any $i \ge 2$, $L_{i-1}^{5(*)} = Sub(L_{i-2}^{5(*)}, int(CUR_{i-1}^{5(*)}))$ and element $\epsilon_1^{4(*)}(i,5)$ it may be possible to obtain $$CUR_i^{5(*)} =$$

$$= (CUR_i^{4(*)} \oplus \epsilon_1^{4(*)}(i,5)) \oplus \phi_f{5(*)} \\ (\delta^{(int(CUR_{i-1}^{4(*)})+L_{i-1}^{5(*)}(int(CUR_{i-1}^{4(*)}),2^5))\bmod 2^5}) \oplus$$

$$\oplus \phi_g{5(*)}(\beta^{(int(CUR_{i-1}^{5(*)})+L_{i-1}^{4(*)}(int(CUR_{i-1}^{5(*)}),2^5))\bmod 2^5}). \quad (57)$$

Eventually the elements of $CUR^{6(*)}$ are computed with involving elements $(\epsilon_2^{4(*)})^{-1}(i,5)$ of a reverse filter $(\epsilon_2^{4(*)})^{-1}$, $i=1, 2, \ldots$, that is, $$CUR_1^{6(*)} =$$

$$= (CUR_1^{5(*)} \oplus (\epsilon_2^{4(*)})^{-1}(1,5)) \oplus \phi_f{5(*)} \\ (\delta^{(t_1^{6(*)}+L_0^{6(*)}(t_1^{6(*)}),2^5))\bmod 2^5}) \oplus$$

$$\oplus \phi_g{5(*)}(\beta^{(t_2^{6(*)}+L_0^{5(*)}(t_2^{6(*)}),2^5))\bmod 2^5}) \quad (58)$$

for the corresponding $t_1^{6(*)}$ and $t_2^{6(*)}$ and for $L_0^{5(*)}$ that was used for the computing $CUR_1^{5(*)}$. For $L_{i-1}^{6(*)} = Sub(L_{i-2}^{6(*)}, int(CUR_{i-1}^{6(*)}))$ and element $(\epsilon_2^{4(*)})^{-1}(1,5)$ it may be possible to calculate for $i \ge 2$ $$CUR_i^{6(*)} = (CUR_i^{5(*)} \oplus (\epsilon_2^{4(*)})^{-1}(i,5)) \oplus \quad (59)$$

$$\varphi_f{5(*)}\left(\delta^{(int(CUR_{i-1}^{5(*)})+L_{i-1}^{6(*)}(int(CUR_{i-1}^{5(*)}),2^5))\bmod 2^5}\right) \oplus$$

$$\oplus \varphi_g{5(*)}\left(\beta^{(int(CUR_{i-1}^{6(*)})+L_{i-1}^{5(*)}(int(CUR_{i-1}^{6(*)}),2^5))\bmod 2^5}\right).$$

In general, considering an iterated transformations with the corresponding parameters of degree $d>1$ and having a table Dfl with elements $$(s_1[h_1], u_1), (s_2[h_2], u_2), \ldots, (s_w[h_w], u_w)), \quad (60)$$

it may be possible to assume that collections $$Sub^{s_1(*)}(2^n, m_{s_1}), Sub^{s_2(*)}(2^n, m_{s_2}), \ldots, Sub^{s_w(*)}(2^n, m_{s_w}) \quad (61)$$

and bit strings $$e_1^{s_1(*)}, \ldots, e_{m_{s_1}}^{s_1(*)}, e_1^{s_2(*)}, \ldots, e_{m_{s_2}}^{s_2(*)}, \ldots, e_1^{s_w(*)}, \ldots, e_{m_{s_w}}^{s_w(*)} \quad (62)$$

with sizes $$\sigma_1^{s_1(*)}, \ldots, \sigma_{m_{s_1}}^{s_1(*)}, \sigma_1^{s_2(*)}, \ldots, \sigma_{m_{s_2}}^{s_2(*)}, \ldots, \sigma_1^{s_w(*)}, \ldots, \sigma_{m_{s_w}}^{s_w(*)} \quad (63)$$

correspondingly, are prepared. Bit strings (62) are related to collections $CUR^{s_1(*)}, \ldots, CUR^{s_w(*)}$, respectively. It may be noted that $1 \le v_1 \le m_{s_1}$, $1 \le v_2 \le m_{s_2}$, $\ldots$, $1 \le v_w \le m_{s_w}$ and $$\max\{s_1, s_2, \ldots, s_w\} < d, \max\{u_1, u_2, \ldots, u_w\} \le d.$$

It may be also assumed that $s_1 < u_1$, $s_2 < u_2$, $\ldots$, $s_w < u_w$ and that $u_1, u_2, \ldots, u_w$ are different, and that some (or all) of $s_1[h_1]$, $s_2[h_2], \ldots, s_w[h_w]$ in (60) may be with degree $-1$.

We will say that $s_1$-filter $h_1$ is set up for the transformation of degree $u_1$, $s_2$-filter $h_2$ is set up for the transformation of degree $u_2$ and so forth. If, for instance, a pair $(s_r^{-1}[h_r], u_r)$ is an element of a table (60) we will say that an inverse $s_r$-filter $h_r$, is set up for the transformation of degree $u_r$, or that an $s_r$-filter $h_r$, is set up for the transformation of degree $u_r$ in inverse order. If, for example, $m_{s_1} = 1$, that is, there is just one bit string associated with $CUR^{s_1(*)}$, it may be possible simply to say that $s_1$-filter is set up for the transformation of degree $u_1$.

Thus, taking into account Dfl table (52) it may be possible to say that 2-filter is set up for the transformation of degree 3, 4-filter 1 is set up for the transformation of degree 5 and inverse 4-filter 2 is set up for the transformation of degree 6. Sometimes we may say that 2-filter $\epsilon^{}$, or simply $\epsilon^{}$ filter is set up for the transformation of degree 3, 4-filter $\epsilon_1^{4(*)}$, or simply filter $\epsilon_1^{4(*)}$ is set up for the transformation of degree 5, and inverse 4-filter $\epsilon_2^{4(*)}$, or simply inverse $\epsilon_2^{4(*)}$ filter is set up for the transformation of degree 6. We may also say that a filter $\epsilon_2^{4(*)}$ is set up for the transformation of degree 6 in inverse order.

4. Iterated Transformations with Direct Filters and Bit Strings

In an embodiment of the present invention a modified procedure of updating the bit strings in a framework of the iterated transformations with direct filters may be presented.

Consider iterated transformations of a degree $d>1$ with direct filters. It means that a table Dfl related to the transformations with direct filters is not empty. Assume that a table Dfl contains at least one pair, say $(i,j)$, for $i>j$, $i \ge 0$ and $j \le d$, that is, we assume that at least one bit string $\epsilon$ is associated with a collection $CUR^{i(*)}$. It may be possible to update a bit string $\epsilon$ in a framework of computing elements of a collection $CUR^{i(*)}$. However keeping in mind that the bit string is used as a filter in a framework of computing elements of $CUR^{j(*)}$ the updating procedure of a bit string $\epsilon$ is slightly modified.

From the very beginning all the bits of bit string $\epsilon$ are set to 0. If M is a message, which is processed, a splitting with jumping procedure is applied to M and the computation of an element $CUR_1^{i(*)}$ may be performed. After that it is possible to start updating a bit string $\epsilon$ by applying procedure Forming the bit string I, or Forming the bit string II, however the process of updating a bit string $\epsilon$ has to be postponed. As a pair (i,j) is an element of a table Dfl, i-filter $\epsilon$ is set up for the transformation of degree j. We claim that for any i≥0 we do not update bit string $\epsilon$ associated to $CUR^{i(*)}$ until element $CUR_1^{j(*)}$ is computed. In other words, unless the computation of $CUR_1^{j(*)}$ realized by $$CUR_1^{j(*)} = (CUR_1^{(j-1)(*)} \oplus \epsilon^{i(*)}(1,n)) \oplus \phi_{j^{i(*)}}(\delta^{(t_1^{j(*)} + L_0^{j(*)}(t_1^{j(*)}, 2^5)) \mod 2^5}) \oplus$$

$$\oplus \phi_{g^{j(*)}}(\beta^{(t_2^{j(*)} + L_0^{(j-1)(*)}(t_2^{j(*)}, 2^5)) \mod 2^5})$$

is completed for the corresponding $t_1^{j(*)}$, $t_2^{j(*)}$, $f^{j(*)}$, $g^{j(*)}$, $L_0^{j(*)}$ and $L_0^{(j-1)(*)}$, the procedure of updating a bit string $\epsilon$ is not applied.

Let $(s[h], u)$, $1 \leq h \leq m_s$ be any pair of a table Dfl, where $Sub^{s(*)}(2^n, m_s)$, $s \geq 0$, $m_s > 1$ is a collection of the corresponding subsets associated to $CUR^{s(*)}$ and assume that a bit string $e_h^{s(*)}$ is associated with not empty $S_h \epsilon Sub^{s(*)}(2^n, m_s)$. Then for any $j \geq 1$ such $int(CUR_j^{s(*)}) \in S_h$ a procedure of updating a bit string $e_h^{s(*)}$ is not applied until the computation of element $CUR_j^{u(*)}$ is not completed. The same condition of updating a bit string $e_j^{s(*)}$ is applied if a table Dfl contains a pair $(s^{-1}[h], u)$, $1 \leq h \leq m_s$, $m_s > 1$.

In general, assume that for some $s \geq 0$ and $1 \leq m_s \leq 2^n$, $Sub^{s(*)}(2^n, m_s)$ is a collection of some non empty subsets associated to $CUR^{s(*)}$ and $e_i^{s(*)}$, $i=1, \ldots, m_s$ is a collection of bit strings related to $CUR^{s(*)}$. Assume that a table Dfl contains pairs $(s[i], u_i)$, $i=1, \ldots, m_s$. Then for any $j \geq 1$ after computing an element $CUR_j^{s(*)}$ a procedure of updating any of bit strings $e_i^{s(*)}$, $i=1, \ldots, m_s$ is not applied until the computation of element $CUR_j^{u_m(*)}$ is not completed, where $u_m = \max\{u_i\}$, $i=1, \ldots, m_s$. The same condition of updating bit strings $e_i^{s(*)}$, $i=1, \ldots, m_s$ takes place if some or all filters assigned by a table Dfl are applied in inverse order.

In an embodiment of the present invention the presented above condition of updating a bit string used as a filter will be referred to as the filters updating condition I.

5. Iterated Transformations with Special Filters

In an embodiment of the present invention iterated transformations with special filters may be presented.

Without losing generality consider the Continuation of the Example I presented above. It may be possible to build a Dfl table with the following pairs $$(2,2), (4[1], 4), (4^{-1}[2], 6). \tag{64}$$

It means that it is possible to set up filters for the transformation procedures of the same degree, to which the corresponding bit strings are associated. We will refer such filters to as special filters. Of course, the updating filters condition I should hold for the case as well.

In general, if there is just one bit string $\epsilon^{s(*)}$, which is associated to an iterated transformation of a degree $s \geq 0$ and the bit string is used as a special filter, at any stage of computation no updating bit string procedure should be applied until the computation of the corresponding element of $CUR^{s(*)}$ is completed.

6. Iterated Transformations with Backward Filters

In an embodiment of the present invention iterated transformations with backward filters may be presented.

Consider a table Dfl of an iterated transformation of a degree d>0 containing the following pairs $$(i_1[v_1], j_1), (i_2[v_2], j_2), \ldots, (i_s[v_s], j_s) \tag{65}$$

where $i_1 > j_1$, $i_2 > j_2$, $\ldots$, $i_s > j_s$ for some $1 \leq v_1 \leq m_1$, $1 \leq v_2 \leq m_2, \ldots, 1 \leq v_s \leq m_s$, and $m_1, m_2, \ldots, m_s$ are the numbers of bit strings associated with iterated transformations of degrees $i_1$, $i_2, \ldots, i_s$, correspondingly. Such filters will be referred to as backward filters.

Taking into account the Continuation to Example I, it is possible, for instance, to consider a table Dfl containing the following pairs $$(2^{-1}, 0), (4^{-1}[1], 1), (4[2], 3), \tag{66}$$

that is, a filter $\epsilon^{**}$ is set up in reverse order for the transformation of degree 0, a filter $\epsilon_1^{4(*)}$ is set up in reverse order for the transformation of degree 1 and filter $\epsilon_2^{4(*)}$ is set up for the transformation of degree 3. Thus, pairs (66) may be considered as an example of three backward filters that may be set up in a framework of Example I presented above. The updating filters condition I for backward filters is the same as for special filters.

7. Iterated Transformations with Filters I

In an embodiment of the present invention iterated transformations with universal filters may be presented. In the iterated transformations with universal filters for transformations of various degrees it may be possible simultaneously apply forward, backward and universal filters.

It may be possible to consider an iterated transformation where forward filters, backward filters and special filters are set up. For instance, taking into account the Continuation to Example I presented above it is possible to consider a table Dfl containing the following pairs $$(2^{-1}, 5), (4[1], 1), (4[2], 4). \tag{67}$$

that is, a filter $\epsilon^{**}$ is set up for transformation of degree 5 in reverse order, a filter $\epsilon_1^{4(*)}$ is set up for transformation of degree 1 and a special filter $\epsilon_2^{4(*)}$ is set up for transformation of degree 4. Moreover, a reverse filter $(\epsilon^{**})^{-1}$ is formed using a backward splitting with jumping scheme II with $Spl_2$ table.

It is also possible, for instance, to consider a table Dfl containing the pairs $$(2^{-1}, 0), (4[1], 1), (4[2], 4), \tag{67'}$$

or $$(2^{-1}, 0), (2, 6), (4[1], 1), (4[2], 4), \tag{67''}$$

and so forth.

Thus, direct, backward or special filters may be set up for an iterated transformation of any degree. Such iterated transformations will be referred to as the iterated transformations with universal filters or simply, iterated transformations with filters.

8. Encryption Based on Iterated Transformations with Filters

In an embodiment of the present invention an encryption procedure based on an iterated transformation with filters may be presented. The presented below encryption procedure with filters allows using any number of filters that play role of keystreams in the encryption scheme.

Without losing generality we may fix some $4 \leq n \leq 10$ and choose a key K, the size of which is defined in accordance with the procedure presented above. Let, further, M be a message that should be encrypted. Assume also that we consider an iterated transformation of a degree d>1 with filters set up in accordance with some Dfl table. If Dfl table does not contain any pairs, a cipher is generated in accordance with encryption without filters procedure already presented above. So assume that Dfl table contains at least one pair, which means that at least one bit string is associated with $CUR^{s(*)}$ for some $0 \leq s \leq d$.

The procedure of generating a cipher for a message M with a key K is similar to the encryption procedure without filters presented above. The main difference is that the iterated transformation with filters is applied now.

Without losing generality we demonstrate a process of generating a cipher based on the Continuation to Example I. Since n=5, an 160 bits key K should be used for encrypting a message M. It may be stressed that the iterated transformation with filters procedure is applied during all three stages of generating a cipher. Assume that filters are set up in accordance with a table Dfl that contains pairs (67).

As it was presented above, in section "Encryption without filters" the process of generating a cipher for a message M consists of three stages.

The process of generating a cipher may be split in the same three stages in the case of encryption with filters. The first stage begins with applying to a sequence of bits K||M a splitting with jumping procedure, the iterated transformation procedure of degree 6 with filters, and the forming bit strings procedure. It is important to note that Dfl table becoming a part of IV. It may be also noted that the filters updating condition I should take place during all three stages. Again, the first stage is a preliminary stage, so no part of a cipher is generated during this stage.

And again it may happen that during the splitting with jumping procedure applied to a key K a few last bits of a key may not be presented as a 5-bit word (or as an element of $F_2^5$), as the number of the bits may be fewer than 5, and therefore, these last bits of a key K cannot be processed. We again denote the number of the bits by rf where $0 \leq rf < 5$.

The first stage is completed when a key K is processed and the last rf bits of the key, which will be denoted by $K_{rf}$, remain unprocessed.

The second stage begins with processing a sequence $K_{rf}||M$, (actually, a collection of bits K||M is processed from the beginning and the moment when a subsequence $K_{rf}||M$ of a sequence K||M started to be processed is important, because a ciphertext is generated starting from the moment), that is, with applying the splitting with jumping procedure, the iterated transformation procedure with filters and the forming bit strings procedure.

The second stage is completed when a sequence of bits $K_{rf}||M$ is processed. Again, it may happen that last rs bits of a message M, where $0 \leq rs < 5$ cannot be processed as rs bits may not be enough to form a 5-bit word, that is, an element of splitting. Denote by $M_{rs}$ a sequence of last $0 \leq rs < 5$ bits of M and let $$CUR_{F_1}^{6(*)}, CUR_{F_2}^{6(*)}, \ldots, CUR_{F_l}^{6(*)} \qquad (68)$$

be the elements of the iterated masking procedure with filters of degree 6 generated during processing a sequence $K_{rf}||M$. Indices $F_i$ in expressions (68) are used to emphasize the fact that elements $CUR_{F_i}^{6(*)}$, i=1, ..., l were generated using the iterated masking procedure with filters. Once again, the filters are defined by a Dfl containing pairs (67).

Elements of a sequence (68) will be a part of a ciphertext of a message M based on a key K.

The third stage begins with processing a sequence of bits $M_{rs}||BS$, where BS is a sequence of bits that is formed based on a collection of bit strings $\epsilon^{**}$, $\epsilon_1^{4(*)}$ and $\epsilon_2^{4(*)}$ in accordance with $$BS = \epsilon^{**} \oplus \epsilon_1^{4(*)} \oplus \epsilon_2^{4(*)}. \qquad (69)$$

In an embodiment of the present invention it may be possible to stress that during the first and the second stages of generating a ciphertext, in accordance with the Continuation to Example I, bit strings $\epsilon^{**}$, $\epsilon_1^{4(*)}$ and $\epsilon_2^{4(*)}$ are constantly updated in accordance with the Forming the bit strings II procedure presented above; however in general, different bit strings may be updated by different procedures. The filters updating condition I, presented earlier, should hold.

We may denote by $$CUR_{T_1}^{6(*)}, CUR_{T_2}^{6(*)}, \ldots, CUR_{T_p}^{6(*)} \qquad (70)$$

the elements of the iterated transformation with filters procedure of degree 6 generated during processing a sequence $M_{rs}||BS$. Since the length of BS is 200 bits, $p \geq 40$.

A ciphertext of a message M is a sequence of bits $$CUR_{F_1}^{6(*)}||CUR_{F_2}^{6(*)}||\ldots||CUR_{F_l}^{6(*)}||CUR_{T_1}^{6(*)}||\ldots \\ ||CUR_{T_p}^{6(*)}||\bar{s}_1||LB, \qquad (71)$$

where LB is an informational sequence of bits. It may be possible to remind that LB is an informational part of a ciphertext, and the size of LB is 2 bytes. LB contains parameters rf, rs, rt and a number s of bits 1 in a sequence $s_1$, $0 \leq s < 8$, where s=NBC mod 8 and NBC is a number of bits of a sequence $$CUR_{F_1}^{6(*)}||CUR_{F_2}^{6(*)}||\ldots||CUR_{F_l}^{6(*)}||CUR_{T_1}^{6(*)}||\ldots \\ ||CUR_{T_p}^{6(*)}. \qquad (72)$$

9. Decryption of a Ciphertext Generated by a Cipher Based on Iterated Transformations with Filters In an embodiment of the present invention a procedure of decrypting a ciphertext generated by a cipher based on iterated transformations with filters with using a key and IV may be presented.

The procedure of decrypting a ciphertext constructed with the use of an iterated transformation with filters is similar to the decryption procedure that was presented above, in subsection "Decryption" of section "Encryption without filters"; however there is a difference as during the decryption procedure presented below bit strings will be used.

Without losing generality we demonstrate the process of decrypting a cipher based on Example I and filters defined by a table Dfl containing pairs (67), that is, pairs $(2^{-1},5)$, $(4[1],1)$, $(4[2],4)$. It is important to note that Dfl table becoming a part of IV.

Assume that it is necessary to decipher a sequence of bits (72), that is, a sequence $$CUR_{F_1}^{6(*)}||CUR_{F_2}^{6(*)}||\ldots||CUR_{F_l}^{6(*)}||CUR_{T_1}^{6(*)}||\ldots \\ ||CUR_{T_p}^{6(*)}||\bar{s}_1||LB. \qquad (73)$$

As the structure of 2 last bytes of a cipher, that is, the structure of LB is known, it is possible to obtain parameters rf, rs, rt and a number s. This means that the following part $$CUR_{F_1}^{6(*)}||CUR_{F_2}^{6(*)}||\ldots||CUR_{F_l}^{6(*)}||CUR_{T_1}^{6(*)}||\ldots \\ ||CUR_{T_p}^{6(*)} \qquad (74)$$

may be extracted from a ciphertext (73).

Next, it is necessary to process a key K up to the moment when last $0 \leq rf < 5$ bits of K are remained unprocessed. In the result of the processing the following elements $$W_1, W_2, \ldots, W_v \quad (75)$$

$$CURR_1, CURR_2, \ldots, CURR_v,$$

$$CURR_1^*, CURR_2^*, \ldots, CURR_v^*,$$

$$\ldots$$

$$CURR_1^{6(*)}, CURR_2^{6(*)}, \ldots, CURR_v^{6(*)}$$

are generated. Here $W_1, W_2, \ldots, W_v$ are the elements of $S(K,5)$, that is, the elements that were generated during the splitting with jumping procedure applied to a key K. It may be noted that $W_v$ is the last element of $S(K,5)$, which consists of just bits of a key K, so the next element of the splitting with jumping procedure (applied to K∥M) would contain at least one bit from a message M. Since in a framework of the Continuation to Example I a splitting procedure not with maximum jumping is applied, $v \geq 32$.

$CURR_i, CURR^*_i, \ldots, CURR_i^{6(*)}$ are the elements that were computed based on a elements $W_i$, $i=1, \ldots, v$ and the corresponding collections $$V_j, L_j, L^*_j, \ldots, L_j^{6(*)}, \quad (76)$$

$j=0, \ldots, v-1$ in accordance with the iterated transformations with filters procedure presented above. Collections (76), in turn, are also calculated during the iterated transformations with filters procedure. It may be stressed that, firstly, all bits of all bit strings $$\epsilon^{**}, \epsilon_1^{4(*)}, \epsilon_2^{4(*)} \quad (76')$$

from the beginning are set to 0 and, secondly, bit strings (76') are updated during the calculation; however all the bit strings are updated based on the following condition formulated below for a general case.

Assume that for some $s \geq 0$ and $1 \leq m_s \leq 2^n$, $Sub^{s(*)}(2^n, m_s)$ is a collection of some non empty subsets associated to $CUR^{s(*)}$ and $e_i^{s(*)}$, $i=1, \ldots, m_s$ is a collection of bit strings related to $CUR^{s(*)}$. Assume that a table Dfl, in particular, contains pairs $(s[i], u_i)$, $i=1, \ldots, m_s$ and assume that direct filters, backward filters and special filters are set up. Then for any $j \geq 1$ after computing an element $CUR_j^{s(*)}$ a procedure of updating any of bit strings $e_i^{s(*)}$, $i=1, \ldots, m_s$ is not applied until the computation of element $CUR_j^{u_m(*)}$ is not completed, where $u_m = \min\{u_i\}$, $i=1, \ldots, m_s$.

In an embodiment of the present invention the described above condition will be referred to as the filters updating condition II, or updating filters condition II. Thus, the bit strings may be updated in accordance with the procedure "Forming the bit strings II"; however the filters updating condition II presented above should hold.

A receiver may start using a ciphertext in order to obtain a plaintext upon completing the calculation of all elements (75) and $V_v, L_v, L^*_v, \ldots, L_v^{6(*)}$ computed by $$L_v = Sub(L_{v-1}, CURR_v),$$

$$V_v = Sub(V_{v-1}, W_v),$$

-continued $$L_v^* = Sub(L_{v-1}^*, CURR_v^*),$$

$$\ldots$$

$$L_v^{6(*)} = Sub(L_{v-1}^{6(*)}, CURR_v^{6(*)}).$$

The first n-bit word of a ciphertext form $CUR_1^{6(*)}$; thus, based on elements (75), $V_v, L_v, L^*_v, \ldots, L_v^{6(*)}$ and $CUR_1^{6(*)}$ one needs to compute the first 5-bit word of a sequence of bits $K_{rf}\|M$, where, again $K_{rf}$ is a sequence of last $0 \leq rf < 5$ bits of a key K. In order to obtain the first 5-bit word of a sequence $K_{rf}\|M$, it may be necessary to compute one by one the following elements $$CUR_1^{5(*)}, CUR_1^{4(*)}, \ldots, CUR_1. \quad (77)$$

It is possible to present the expression of $CUR_1^{6(*)}$, keeping in mind pairs $(2^{-1},5)$, $(4[1],1)$, $(4[2],4)$ of a table Dfl, elements (75) and collections $V_v, L_v, L^*_v, \ldots, L_v^{6(*)}$. It may be possible to write $$CUR_1^{6(*)} = CUR_1^{5(*)} \oplus$$

$$\oplus \phi_f^{6(*)}(\delta^{(int(CURR_v^{5(*)}) + L_v^{6(*)}(int(CURR_v^{5(*)}), 2^5)) \mod 2^5}) \oplus$$

$$\oplus \phi_g^{6(*)}(\beta^{(int(CURR_v^{6(*)}) + L_v^{5(*)}(int(CURR_v^{6(*)}), 2^5)) \mod 2^5}), \quad (78)$$

which gives $$CUR_1^{5(*)} = CUR_1^{6(*)} \oplus$$

$$\oplus \phi_f^{6(*)}(\delta^{(int(CURR_v^{5(*)}) + L_v^{6(*)}(int(CURR_v^{5(*)}), 2^5)) \mod 2^5}) \oplus$$

$$\oplus \phi_g^{6(*)}(\beta^{(int(CURR_v^{6(*)}) + L_v^{5(*)}(int(CURR_v^{6(*)}), 2^5)) \mod 2^5}). \quad (79)$$

Next, since $$CUR_1^{5(*)} = CUR_1^{4(*)} \oplus (\epsilon^{**})^{-1}(v+1, 5)$$

$$\oplus \phi_f^{5(*)}(\delta^{(int(CURR_v^{4(*)}) + L_v^{5(*)}(int(CURR_v^{4(*)}), 2^5)) \mod 2^5}) \oplus$$

$$\oplus \phi_g^{5(*)}(\beta^{(int(CURR_v^{5(*)}) + L_v^{4(*)}(int(CURR_v^{5(*)}), 2^5)) \mod 2^5})$$

it is possible to compute $$CUR_1^{4(*)} = CUR_1^{5(*)} \oplus (\epsilon^{**})^{-1}(v+1, 5)$$

$$\oplus \phi_f^{5(*)}(\delta^{(int(CURR_v^{4(*)}) + L_v^{5(*)}(int(CURR_v^{4(*)}), 2^5)) \mod 2^5}) \oplus$$

$$\oplus \phi_g^{5(*)}(\beta^{(int(CURR_v^{5(*)}) + L_v^{4(*)}(int(CURR_v^{5(*)}), 2^5)) \mod 2^5})$$

using the v+1-th element $(\epsilon^{})^{-1}(v+1, 5)$ of bit string $\epsilon^{}$. Continuing the computations it is possible to obtain $$CUR_1^{3(*)} = CUR_1^{4(*)} \oplus \epsilon_2^{4(*)}(v+1, 5) \oplus$$

$$\oplus \phi_f^{4(*)}(\delta^{(int(CURR_v^{3(*)}) + L_v^{4(*)}(int(CURR_v^{3(*)}), 2^5)) \mod 2^5}) \oplus$$

$$\oplus \phi_g^{4(*)}(\beta^{(int(CURR_v^{4(*)}) + L_v^{3(*)}(int(CURR_v^{4(*)}), 2^5)) \mod 2^5}),$$

$$CUR^{**}_1 = CUR_1^{3(*)} \oplus$$

$$\oplus \phi_f^{3(*)}(\delta^{(int(CURR^{**}_v) + L_v^{3(*)}(int(CURR^{**}_v), 2^5)) \mod 2^5}) \oplus$$

$$\oplus \phi_g^{3(*)}(\beta^{(int(CURR_v^{3(*)}) + L^{**}_v(int(CURR_v^{3(*)}), 2^5)) \mod 2^5}),$$

$$CUR^*_1 = CUR^{**}_1 \oplus$$

$$\oplus \phi_{f^{**}}(\delta^{(int(CURR^*_v) + L^{**}_v(int(CURR^*_v), 2^5)) \mod 2^5}) \oplus$$

$$\oplus \phi_{g^{}}(\beta^{(int(CURR^{}_v) + L^*_v(int(CURR^{**}_v), 2^5)) \mod 2^5}), \quad (80)$$

$$CUR_1 = CUR^*_1 \oplus \epsilon_1^{4(*)}(v+1, 5) \oplus$$

$$\oplus \phi_{f^*}(\delta^{(int(CURR_v)+L^*_v(int(CURR_v),2^5))mod\ 2^5}) \oplus$$

$$\oplus \phi_{g^*}(\beta^{(int(CURR^*_v)+L_v(int(CURR^*_v),2^5))mod\ 2^5}) \qquad (81)$$

and eventually $$M_1 = CUR_1 \oplus$$

$$\oplus \phi_f(\delta^{(int(W_v)+L_v(int(W_v),2^5))mod\ 2^5}) \oplus$$

$$\oplus \phi_g(\beta^{(int(CURR_v)+V_v(int(CURR_v),2^5))mod\ 2^5}).$$

Here $M_1$ is the first 5-bit word of $K_r \| M$. Collections $L_{v+1}^{6(*)}$, $L_{v+1}^{5(*)}, \ldots, L_{v+1}, V_{v+1}$ are gradually calculated upon obtaining elements $CUR_1^{6(*)}$, $CUR_1^{5(*)}, \ldots, CUR_1, M_1$, correspondingly.

It may be stressed again that bit strings (76') are updated in accordance with the filters updating condition II. This means, for instance, that bit string $\epsilon^{**}$ may be updated upon performing computation (80), while both bit strings $\epsilon_1^{4(*)}$, $\epsilon_2^{4(*)}$ may be updated upon completion of computation (81).

The presented above computation may be continued to up to the moment when the whole sequence (74) is processed. In a result of the computation a collection of elements $$M_1, M_2, \ldots, M_l, M_{T_1}, M_{T_p} \qquad (82)$$

may be obtained. The procedure of restoring a message M from a collection (82) is similar to the procedure described in details in sub-section "Decryption" of section "Encryption without filters."

10. Iterated Transformations with Filters II

In an embodiment of the present invention one more construction of iterated transformations with universal filters may be presented. The presented construction allows realizing more complicated way of embedding filters into transformations of various degrees. The new method makes an analysis of "action" of filters during computation of elements of transformations of various degrees more complicated.

Without losing generality it is possible to demonstrate the new construction of iterated transformation with filters based on the Continuation of Example I. Consider a table Sfl consisting of the following pairs $$(2^{-1},0),(4[1],2). \qquad (82')$$

We will use notation Sfl to stress that pairs (82') will be used in a way different from using pairs of a table Dfl (see "Iterated transformations with filters I").

Let $M_1, M_2, M_3, \ldots$ be elements of a splitting with jumping procedure applied to a message M. We will use a splitting with jumping procedure specified in Example I, or the Continuation of Example I presented above. It may be possible to start with computing elements of CUR. For $L_0, V_0$ and $t_1$ and $t_2$ specified in Example I it is possible to compute $$CUR_1 = M_1 \oplus \phi_f(\delta^{(t_1+L_0(t_1,2^5))mod\ 2^5})$$
$$\oplus \phi_g(\beta^{(t_2+v_0(t_2,2^5))mod\ 2^5}).$$

Next, it may be possible to calculate $$L_1 = Sub(L_0, int((\epsilon^{**})^{-1}(1,5))), V_1 = Sub(V_0, int(M_1)),$$

and compute $CUR_2$ by $$CUR_2 = M_2 \oplus \phi_f(\delta^{(int(M_1)+L_1(int(M_1),2^5))mod\ 2^5}) \oplus$$

$$\oplus \phi_g(\beta^{(int(CUR_1)+v_1(int(CUR_1),2^5))mod\ 2^5}).$$

After that we may generate $$L_2 = Sub(L_1, int((\epsilon^{**})^{-1}(2,5))), V_2 = Sub(V_1, int(M_1))$$

and calculate $$CUR_3 = M_3 \oplus \phi_f(\delta^{(int(M_2)+L_2(int(M_2),2^5))mod\ 2^5}) \oplus$$

$$\oplus \phi_g(\beta^{(int(CUR_2)+V_2(int(CUR_2),2^5))mod\ 2^5}).$$

For any i>3 and for $$L_{i-1} = Sub(L_{i-2}, int((\epsilon^{**})^{-1}(i-1,5))),$$

$$V_{i-1} = Sub(V_{i-2}, int(M_{i-1}))$$

it may be possible to compute $$CUR_i = M_i \oplus \phi_f(\delta^{(int(M_{i-1})+L_{i-1}(int(M_{i-1}),2^5))mod\ 2^5}) \oplus$$

$$\oplus \phi_g(\beta^{(int(CUR_{i-1})+V_{i-1}(int(CUR_{i-1}),2^5))mod\ 2^5}).$$

Elements of CUR* are computed in accordance with the procedure presented in section "Iterated transformation" of the invention. First, based on $L^*_0$, $t^*_1$ and $t^*_2$ it is possible to compute $$CUR^*_1 = CUR_1 \oplus \phi_{f^*}(\delta^{(t^*_1+L^*_0(t^*_1,2^n))mod\ 2^n}) \oplus \phi_{g^*}$$
$$(\beta^{(t^*_2+L_0(t^*_2,2^n))mod\ 2^n}).$$

We note that $L_0$ was used for the calculation of $CUR_1$.

Then it is possible to compute $L^*_1 = Sub(L^*_0, int(CUR^*_1))$ and calculate $$CUR^*_2 = CUR_2 \oplus \phi_{f^*}(\delta^{(int(CUR_1)+L^*_1(int(CUR_1),2^5))mod\ 2^5}) \oplus$$

$$\oplus \phi_{g^*}(\beta^{(int(CUR^*_1)+L_1(int(CUR^*_1),2^5))mod\ 2^5}).$$

For any i>3 and for $L^*_{i-1} = Sub(L^*_{i-2}, int(CUR^*_{i-1}))$ an expression for $CUR^*_i$ may be written in a form $$CUR^*_i = CUR_i \oplus \phi_{f^*}(\delta^{(int(CUR_{i-1})+L^*_{i-1}(int(CUR_{i-1}),2^5))mod\ 2^5}) \oplus$$

$$\oplus \phi_{g^*}(\beta^{(int(CUR^*_{i-1})+L_{i-1}(int(CUR^*_{i-1}),2^5))mod\ 2^5}).$$

Further, as it was specified by Sfl table (82') elements of a filter $\epsilon_1^{4(*)}$ are involved in computation of elements of CUR. Again, based on $L^{}_0$, $t^{}_1$ and $t^{}_2$ it is possible to compute $$CUR^{**}_1 = CUR^*_1 \oplus \phi_{f^{}}(\delta^{(t^{}_1+L^{}_0(t^{}_1,2^5))mod\ 2^5}) \oplus \phi_{g^*}$$
$$(\beta^{(t^{**}_2+L^*_0(t^{**}_2,2^5))mod\ 2^5}).$$

Then $L^{}_1 = Sub(L^{}_0, int(\epsilon_1^{4(*)}(1,5)))$ may be calculated and it may be possible to continue the computation $$CUR^{**}_2 = CUR^*_2 \oplus \phi_{f^{**}}(\delta^{(int(CUR^*_1)+L^{**}_1(int(CUR^*_1),2^5))mod\ 2^5}) \oplus \phi_{g^*}(\beta^{(CUR^{**}_1+L^*_1(CUR^{**}_1,2^5))mod\ 2^5}).$$

Then again $L^{}_2 = Sub(L^{}_1, int(\epsilon_1^{4(*)}(2,5)))$ may be computed and it is possible to calculate $$CUR^{**}_3 = CUR^*_3 \oplus \phi_{f^{**}}$$
$$(\delta^{(int(CUR^*_2)+L^{**}_2(int(CUR^*_2),2^5))mod\ 2^5})$$

$$\oplus \phi_{g^*}(\beta^{(CUR^{**}_2+L^*_2(CUR^{**}_2,2^5))mod\ 2^5}).$$

In general, for any i>3 and for $L^{}_{i-1} = Sub(L^{}_{i-2}, int(\epsilon_1^{4(*)}(i-1,5)))$ it may be possible to compute $$CUR^{**}_i = CUR^*_i \oplus \phi_{f^{**}}$$
$$(\delta^{(int(CUR^*_{i-1})+L^{**}_{i-1}(int(CUR^*_{i-1}),2^5))mod\ 2^5})$$

$$\oplus \phi_{g^*}(\beta^{(CUR^{**}_{i-1}+L^*_{i-1}(CUR^{**}_{i-1},2^5))mod\ 2^5}).$$

Thus, in a framework of the presented above iterated transformation with filters II the elements of filters $(\epsilon^{**})^{-1}$ and $\epsilon_1^{4(*)}$ are used for updating the collections $L_i$ and $L^{**}_i$, i=0, 1, ..., correspondingly.

It may be noted that the updating condition I presented above needs to be slightly adjusted for the presented iterated transformations with filters II. The adjusted condition of updating bit strings is presented below.

In general, assume that for some $s \geq 0$ and $1 \leq m_s \leq 2^n$, $Sub^{s(*)}(2^n, m_s)$ is a collection of some non empty subsets associated to $CUR^{s(*)}$ and $e_i^{s(*)}$, $i=1, \ldots, m_s$ is a collection of bit strings related to $CUR^{s(*)}$. Assume that a table Sfl contains pairs $(s[i], u_i)$, $i=1, \ldots, m_s$. Then for any $j \geq 1$ after computing an element $CUR_j^{s(*)}$ a procedure of updating any bit string $e_i^{s(*)}$, $i=1, \ldots, m_s$ is not applied until the computation of elements $CUR_j^{u_i(*)}$ and updating all collections $L_{j-1}^{u_i(*)}$, $i=1, \ldots, m_s$ is not completed.

In an embodiment of the present invention the described above condition of updating bit strings will be referred to as the Sfl-condition.

Thus, applying the presented above iterated transformation with filters II with the corresponding Sfl tables, a ciphertext may be generated in a way similar to the process of generating a ciphertext in the case of iterated transformations with filters I presented above. However in this case the Sfl-condition should hold during the process of generating a ciphertext.

A decryption procedure for the iterated transformations with filters II is similar to the decryption procedure for the iterated transformations with filters I presented above. However, the computation of the elements of the transformations degrees of which are specified by Sfl table, should be performed in accordance with presented above procedure. The Sfl table becomes a part of IV.

It is also important to note that the updating of bit strings during the decryption procedure in the case of the iterated transformations with filters II should be performed in accordance with the Sfl-condition presented above.

11. Iterated Transformations with Filters III

In an embodiment of the present invention it may be possible to apply both—iterated transformation with filters I and iterated transformation with filters II applied simultaneously in a framework of an iterated transformation. It may be done by applying the correspond schemes of embedding filters into transformations of various degrees. The combination of the two schemes applied in a framework of an iterated transformation further increasing difficulty of analyzing the influence of filters on the process of the generation of a ciphertext.

Without losing generality it may be possible to illustrate a combination of two methods of applying filters into computation of transformations of various degrees using the Continuation of Example I.

Thus, assume that a table Sfl consisting, for example, of pairs (82') is defined. In accordance with (82') the transformations of degrees 0 and 2 may be computed with involvement of filters $(\epsilon^{**})^{-1}$ and $\epsilon_1^{4(*)}$, correspondingly. The procedure of the computation of elements of CUR and CUR with involvement of filters $(\epsilon^{})^{-1}$ and $\epsilon_1^{4(*)}$ specified by a table Sfl containing pairs (82') was presented above, in section "Iterated transformations with filters II".

Assume, further that a table Dfl with the following pairs $$(2,5), (4[2], 1) \qquad (82'')$$

is defined as well.

The computation of elements of CUR and CUR with the involvement of filters $(\epsilon^{})^{-1}$ and $\epsilon_1^{4(*)}$ specified by a table Sfl containing pairs (82') is presented above.

Now it is possible to realize the computation of elements $CUR^*$ and $CUR^{5(*)}$ with involvement filters $\epsilon^{**}$ and $\epsilon_2^{4(*)}$ in accordance with the construction presented in section "Iterated transformations with filters I". In other words, based on $L^*_0$, $t^*_1$ and $t^*_2$ it may be possible to compute $$CUR^*_1 = (CUR_1 \oplus (\epsilon_2^{4(*)}(1,5))) \oplus \phi_{f^*}(\delta^{(t^*1+L^*0(t^*1,2^n))mod\,2^n}) \oplus$$

$$\oplus \phi_{g^*}(\beta^{(t^*2+L_0(t^*2,2^n))mod\,2^n}).$$

Once again, $L_0$ was used for the calculation of $CUR_1$. Then it may be possible to calculate $L^*_1 = Sub(L^*_0, int(CUR^*_1))$ and continue $$CUR^*_2 = (CUR_2 \oplus (\epsilon_2^{4(*)}(2,5))) \oplus \phi_{f^*}(\delta^{(int(CUR_1)+L^*_1(int(CUR_1),2^5))mod\,2^5}) \oplus$$

$$\oplus \phi_{g^*}(\beta^{(int(CUR^*_1)+L_1(int(CUR^*_1),2^5))mod\,2^5}).$$

For any $i > 3$ and for $L^*_{i-1} = Sub(L^*_{i-2}, int(CUR^*_{i-1}))$ it may be computed $$CUR^*_i = (CUR_i \oplus (\epsilon_2^{4(*)}(2,5))) \oplus \phi_{f^*}(\delta^{(int(CUR_{i-1})+L^*_{i-1}(int(CUR_{i-1}),2^5))mod\,2^5}) \oplus$$

$$\oplus \phi_{g^*}(\beta^{(int(CUR^*_{i-1})+L_{i-1}(int(CUR^*_{i-1}),2^5))mod\,2^5}).$$

Computation of elements of $CUR^{5(*)}$ may be realized by (56) and (57).

It may be noted that during generation of a ciphertext updating of bit strings should be performed in accordance with the updating condition I and Sfl-condition presented above. Specifically, all filters (bit strings) presented in Sfl table should be updated in accordance with Sfl-condition, while all filters (bit strings) presented in Dfl table should be updated in accordance with the updating condition I. It is possible that one and the same filter may be presented in both Dfl and Sfl tables. In this case the updating of the corresponding bit string should be performed in accordance with the condition (updating condition I and Sfl-condition) in accordance with which the updating may be performed on a later stage. In other words, if updating of a bit string in accordance with the updating condition I may be performed earlier than updating in accordance with the Sfl-condition, then the Sfl-condition should be applied, otherwise updating should be performed in accordance with the updating condition I.

A decryption procedure for the iterated transformations with filters III is the same as decryption procedure with filters—it is necessary just to use Sfl and Dfl tables in order to use the elements of the corresponding filters during the computation of elements of the transformations of the specified by the tables degrees. The schemes of embedding the elements of filters specified by tables Sfl and Dfl into the transformations of the corresponding degrees were presented above, in sections "Iterated transformations with filters II" and "Iterated transformations with filters I", respectively. Updating procedures of all bit strings should be performed with firm execution of the filters updating condition II (applied to the filters presented in Dfl table) and the Sfl-condition (applied to the filters presented in Sfl table). If a filter is presented in both tables, then the updating of the corresponding bit string should be performed in accordance with the condition (updating condition II and Sfl-condition) in accordance with which the updating may be performed on a later stage.

12. Iterated Transformations with Filters with Switchers I

In an embodiment of the present invention filters with switchers I may be presented. Applying switching of filters allows realizing a scheme of encryption where one and the same keystream may be used in transformations of different degrees in different periods of generating a ciphertext. The switching may be applied simultaneously to a few filters used during encryption of a message.

Without losing generality it is possible to illustrate filters with switchers based on Continuation of Example I. In a framework of the Continuation of Example I consider an iterated transformation of degree 6 with filters based, for instance, on a table Dfl containing pairs $$(2,0),(2^{-1},5),(4[1],1),(4[2],4).$$

During the process of the computation of elements of iterated transformations with filters, elements $$\epsilon^{}(1,5), \epsilon^{}(2,5), \epsilon^{**}(3,5),\ldots \quad (83')$$

are used in the calculation of elements of collection CUR; elements $$\epsilon_1^{4(*)}(1,5), \epsilon_1^{4(*)}(2,5), \epsilon_1^{4(*)}(3,5),\ldots \quad (83)$$

are used in the calculation of elements of collection CUR*; elements $$\epsilon_2^{4(*)}(1,5), \epsilon_2^{4(*)}(2,5), \epsilon_1^{4(*)}(3,5),\ldots \quad (84)$$

are used in the calculation of elements of collection $CUR^{4(*)}$ and elements $$(\epsilon^{})^{-1}(1,5), (\epsilon^{})^{-1}(2,5), (\epsilon^{**})^{-1}(3,5),\ldots \quad (85)$$

are used in the calculation of elements of collection $CUR^{5(*)}$.

Assume now that we want to construct a few Dfl tables, each of which defines "action" of filters by collections of elements. For instance, it is possible to write a table $Dfl_1$ with pairs $$(2,0)_{\{10\}},(2^{-1},5)_{\{10\}},(4[1],1)_{\{10\}},(4[2],4)_{\{10\}},$$

specifying that the first ten elements of the filters $\epsilon^{}$, $(\epsilon^{})^{-1}$, $\epsilon_1^{4(*)}$ and $\epsilon_2^{4(*)}$ are set up for the transformations of degrees 0, 5, 1 and 4, correspondingly.

Then, for example it is possible to write a table $Dfl_2$ with pairs $$(2,1)_{\{3\}},(2^{-1},3)_{\{3\}},(4[1],0)_{\{3\}},(4[2],6)_{\{3\}}$$

specifying that three elements (starting from the 11-th element in each filter) of filters $\epsilon^{}$, $(\epsilon^{})^{-1}$, $\epsilon_1^{4(*)}$ and $\epsilon_2^{4(*)}$ are set up for the transformations of degrees 1, 3, 0 and 6, respectively.

Next, for instance it is possible to write a table $Dfl_3$ with pairs $$(2,1)_{\{21\}},(2^{-1},0)_{\{21\}},(4[1],4)_{\{21\}},(4[2],5)_{\{21\}}$$

specifying that starting from the 14-th element in each filter twenty one elements of filters $\epsilon^{}$, $(\epsilon^{})^{-1}$, $\epsilon_1^{4(*)}$ and $\epsilon_2^{4(*)}$ are set up for the transformations of degrees 1, 0, 4 and 5, respectively.

Eventually it is possible, for example, to define the fourth table $Dfl_4$ with pairs $$(2,6)_{\{17\}},(2^{-1},4)_{\{17\}},(4[1],5)_{\{17\}},(4[2],0)_{\{17\}}$$

specifying that starting from the 35-th element in each filter seventeen elements of filters $\epsilon^{}$, $(\epsilon^{})^{-1}$, $\epsilon_1^{4(*)}$ and $\epsilon_2^{4(*)}$ are set up for the transformations of degrees 6, 4, 5, and 0, respectively. Finally the fifths table $Dfl_5$ consisting of pairs $$(2,0)_{\{10\}},(2^{-1},5)_{\{10\}},(4[1],1)_{\{10\}},(4[2],4)_{\{11\}}$$

may be defined. The meaning of $Dfl_5$ is the same as $Dfl_1$, however ten elements of the filters $\epsilon^{}$, $(\epsilon^{})^{-1}$, $\epsilon_1^{4(*)}$ and $\epsilon_2^{4(*)}$ that are set up for the transformations of degrees 0, 5, 1 and 4, correspondingly, are generated starting from the 52-nd element in each filter.

A collection of elements of each filter in each table will be called cycles. Thus, the first cycle of a filter $\epsilon^{}$ (that is, a collection of elements of a filter $\epsilon^{}$ in a table $Dfl_1$) consists of ten elements, while the second cycle of a filter $\epsilon^{}$ (that is, a collection of elements of a filter $\epsilon^{}$ in a table $Dfl_2$) consists of three elements.

Instead of writing five tables $Dfl_i$, i=1,..., 5, it is possible to write four tables Dsw for each filter and to point out cycle by cycle four degrees of the transformations, for which the cycles are defined, specifying the number of elements in each cycle. For instance, for $\epsilon^{**}$ it is possible to write a "path of action" for the corresponding cycles by writing $$Dsw_2(0_{\{10\}},1_{\{3\}},1_{\{21\}},6_{\{17\}},0_{\{10\}}) \quad (86)$$

which can be interpreted that filter $\epsilon^{}$ is set up for the transformation of a degree 5 for the elements of the first cycle consisting of ten elements, then filter $\epsilon^{}$ is set up for the transformation of a degree 1 for the elements of the second cycle consisting of three elements, then filter $\epsilon^{}$ is set up for the transformation of a degree 1 for the elements of the third cycle consisting of twenty one elements and eventually filter $\epsilon^{}$ is set up for the transformation of a degree 6 for the elements of the fourth cycle consisting of 17 elements. After that a filter $\epsilon^{}$ is set up again for the transformation of degree 0 for the elements of the fifth cycle consisting of 10 elements, and so forth. In an embodiment of the present invention Dsw table (86) will be referred to as table of switching for a filter $\epsilon^{}$.

The following table of switching may be presented for a filter $(\epsilon^{**})^{-1}$ $$Dsw_{2^{-1}}(5_{\{10\}},3_{\{3\}},0_{\{21\}},4_{\{17\}},5_{\{10\}}), \quad (86')$$

where index $2^{-1}$ indicates that the cycles of a reverse filter related to CUR** are presented in the table.

It is possible also to write the following table of switching for a filter $\epsilon_1^{4(*)}$ $$Dsw_{4[1]}(1_{\{10\}},0_{\{3\}},4_{\{21\}},5_{\{17\}},1_{\{10\}}) \quad (87)$$

while the table of switching for a filter $\epsilon_2^{4(*)}$ may be presented as follows $$Dsw_{4[2]}(4_{\{10\}},6_{\{3\}},5_{\{21\}},0_{\{17\}},4_{\{10\}}). \quad (87')$$

We may say in this case that filters with switchers, or filters with switching are set up for an iterated transformation, or, simply—switchers, or switching are organized for an iterated transformation. Tables (86), (86'), (87), (87') will be called tables of switching, or tables of switchers and the number of cycles in a table of switching will be called a period of switching. Thus, tables of switching (86), (86'), (87) and (87') have periods of switching 5. The number of elements in each cycle will be called a period of a cycle. Thus, periods of all first cycles of all filters with switching are ten, the periods of all second cycles of all filters with switching are 3, and so forth.

It may be noted that switching may be organized even for one bit string. For example, it may be possible to use an encryption scheme with a table Dfl containing pairs $$(2^{-1},5),(4[1],1),(4[2],4)$$

and also to use just one table of switching for a filter $\epsilon^{**}$ $$Dsw_2(3_{\{15\}},0_{\{23\}},6_{\{21\}},0_{\{7\}},3_{\{15\}})$$

that has switching period 5.

At the same time, any number of bit strings may be simultaneously organized as filters with switching. It may be also possible to use filters with and without switching within one and the same iterated transformation procedure. For instance, it may be possible to use an encryption scheme with a table Dfl containing pairs $$(2^{-1},5),(4[1],1),(4[2],4)$$

and also to use two tables of switching $$Dsw_2(3_{\{15\}}, 0_{\{23\}}, 6_{\{21\}}, 3_{\{15\}})$$

and $$Dsw_{4[2]}(6_{\{15\}}, 3_{\{23\}}, 0_{\{21\}}, 6_{\{15\}}).$$

Both switching tables have a switching period 4.

In general, if the number of filters set up with switching is more than one, the elements of the same cycles of the filters with switching should be set up for the transformations of different degrees.

On the other hand, it is possible to set up filters with switching using Dsw tables with different periods. For instance, it may be possible to use again an iterated transformation with a table Dfl containing pairs $$(4[1],1),(4[2],4)$$

and define two tables of switching $$Dsw_2(6_{\{15\}}, 3_{\{23\}}, 6_{\{5\}}, 3_{\{3\}}, 6_{\{15\}})$$

and $$Dsw_{2^{-1}}(5_{\{25\}}, 0_{\{17\}}, 5_{\{25\}}).$$

It may be noted that a table $Dsw_2$ has a switching period 5, while a table $Dsw_{2^{-1}}$ has a switching period 3. However, in this case tables $Dsw_2$ and $Dsw_{2^{-1}}$ specify different collections of degrees of transformations.

Switchers may be also organized for the filters presented in section "Iterated transformations with filters II". Indeed, consider Sfl table containing pairs $$(2^{-1},4),(4[1],5).$$

It may be possible, for example, to define two switching tables $$Ssw_2(0_{\{25\}}, 3_{\{20\}}, 6_{\{15\}}, 2_{\{10\}}, 0_{\{25\}})$$

and $$Ssw_{4[2]}(2_{\{25\}}, 6_{\{20\}}, 0_{\{15\}}, 3_{\{10\}}, 2_{\{25\}}).$$

We denoted the tables by Ssw to emphasize the fact that cycles presented by the tables are applied in a way described in "Iterated transformations with filters II", which is different from the case of Dsw tables.

Thus, switching table $Ssw_2$ may be interpreted as 25 elements of a filter $\epsilon^{}$ are used in updating collections $L_1$, $L_2, \ldots, L_{25}$ in accordance with $$L_i = Sub(L_{i-1}, int(\epsilon^{}(i,5)))$$

$i=1, \ldots, 25$, then next 20 elements of the filter are used in updating collections $L_{26}^{3(*)}, L_{27}^{3(*)}, \ldots, L_{45}^{3(*)}$ by $$L_i^{3(*)} = Sub(L_{i-1}^{3(*)}, int(\epsilon^{**}(i,5)))$$

$i=26, \ldots, 45$. After that 15 elements of the filter starting from the 46-th element are used in updating collections $L_{46}^{6(*)}$, $L_{47}^{6(*)}, \ldots, L_{60}^{6(*)}$ and so forth. Table $Ssw_{4[2]}$ may be interpreted by analogy.

It may be also noted that, for example, collections $L_{26}$, $L_{27}, \ldots$ may be updated by $$L_{26} = Sub(L_{25}, int(CUR_{26})),$$

$$L_{27} = Sub(L_{26}, int(CUR_{27})),$$

and so forth, up to the moment when starting from a collection $L_{96}$ elements of a filter may be used again.

Thus, an encryption procedure for the scheme with filters with switchers I is the same as an encryption procedure, for instance, for the iterated transformations with filters I. Of course, the corresponding switching tables that become a part of IV should be used in order to apply the elements of the corresponding cycles to transformations of appropriate degrees. Updating procedure for the filters (bit strings) has to be performed in accordance with updating condition I and Sfl-condition.

On the other hand, a decryption procedure for the scheme with filters with switching is the same as a decryption procedure with filters—it is just necessary to use the corresponding switching tables in order to apply the elements of the corresponding cycles to the transformations of the degrees defined by the switching tables. Updating procedure of all bit strings should be performed with firm execution of the filters condition II. It is necessary to take into account that the elements of the different cycles are set up for the transformations of different degrees, so the procedures of updating filters should be applied in different moments for different cycles in strict accordance with the updating filters condition II and Sfl-condition for each cycle.

In general, the greater period of switching and the more filters with switching are arranged the harder to analyze and to break the encryption algorithm.

13. Iterated Transformations with Filters with Switchers II

In an embodiment of the present invention one more scheme of applying filters with switchers may be presented. In a framework of forming filters with switchers II filters may be generated by applying a splitting with jumping procedure with any jumping distance to the corresponding bit strings.

Without losing generality the procedure of forming filters with switchers II may be presented using the Continuation of Example I presented above.

In a framework of the Continuation of Example I presented above consider iterated transformations of degree 6 with filters based, for instance, on a table Dfl containing pairs $$(2,0),(2^{-1},5),(4_1,1),(4_2,4). \tag{87''}$$

By $4_1$ and $4_2$ we denoted filters $\epsilon_1^{4(*)}$ and $\epsilon_2^{4(*)}$, correspondingly, associated to $CUR^{4(*)}$.

Assume, next, that we wish to "split" a table Dfl containing pairs (87'') into a collection of Dfl tables containing the following pairs $$(2(1),0),(2^{-1}(1),5),(4_1(1),1),(4_2(1),4) \tag{88}$$

$$(2(2),5),(2^{-1}(2),1),(4_1(2),6),(4_2(2),0) \tag{89}$$

$$(2(3),3),(2^{-1}(3),4),(4_1(3),5),(4_2(3),1) \tag{90}$$

$$(2(4),6),(2^{-1}(4),0),(4_1(4),2),(4_2(4),1) \tag{91}$$

$$(2(5),5),(2^{-1}(5),3),(4_1(5),2),(4_2(5),1) \tag{92}$$

$$(2(6),1),(2^{-1}(6),6),(4_1(6),0),(4_2(6),5) \tag{93}$$

$$(2(7),4),(2^{-1}(7),0),(4_1(7),1),(4_2(7),2) \tag{94}$$

$$(2(8),3),(2^{-1}(8),1),(4_1(8),4),(4_2(8),5) \tag{95}$$

$$(2(9),6),(2^{-1}(9),4),(4_1(9),0),(4_2(9),3) \tag{96}$$

$$(2(10),5),(2^{-1}(10),1),(4_1(10),2),(4_2(10),6) \tag{97}$$

$$(2(11),0),(2^{-1}(11),5),(4_1(11),1),(4_2(11),4) \tag{98}$$

where $2(1), 2(2), 2(3), \ldots$ are, correspondingly, the first, the second, the third and so forth elements of a filter $\epsilon^{}$, $2^{-1}(1)$, $2^{-1}(2), 2^{-1}(3), \ldots$ are, correspondingly, the first, the second, the third and so forth elements of a filter $(\epsilon^{})^{-1}$, and $4_1(1)$, $4_1(2), 4_1(3), \ldots$ are, respectively, the first, the second, the third and so forth elements of a filter $\epsilon_1^{4(*)}$ and $4_2(1)$, $4_2(2)$, $4_2(3), \ldots$ are, correspondingly, the first, the second, the third and so forth elements of a filter $\epsilon_2^{4(*)}$.

However, instead of writing tables (88)-(98) it is possible to write four switching tables $SWt_1$, $SWt_2$, $SWt_3$ and $SWt_4$ containing the degrees of the transformations, in computation elements of which the elements of the corresponding filters were involved. Thus it is possible to write $$(0,5,3,6,5,1,4,3,6,5,0), \quad (99)$$

$$(5,1,4,0,3,6,0,1,4,1,5), \quad (100)$$

$$(1,6,5,2,2,0,1,4,0,2,1), \quad (101)$$

$$(4,0,1,1,4,5,2,5,3,6,4), \quad (102)$$

A switching table $SWt_1$ may be interpreted as elements $2(1)$, $2(2), 2(3), \ldots$ of a filter $\epsilon^{}$ that are used during the generation of the first, the second, the third and so forth elements of the transformations of degrees, correspondingly, 0,5,3 and so forth. A switching table $SWt_2$ may be interpreted as elements $2^{-1}(1), 2^{-1}(2), 2^{-1}(3), \ldots$ of a filter $(\epsilon^{})^{-1}$ that are used during the generation of the first, the second, the third and so forth elements of the transformations of degrees, correspondingly, 5, 1, 3 and so forth. Switching tables $SWt_3$ and $SWt_4$ may be interpreted by analogy.

It may be noted that elements $2(11)$, $2^{-1}(11)$, $4_1(11)$ and $4_2(11)$ are used in transformations of degrees 0, 5, 1, 4, correspondingly, and elements $2(12)$, $2^{-1}(12)$, $4_1(12)$, $4_2(12)$ again are used in generating the 12-th elements of transformations of degrees 5, 1, 6, 0, correspondingly.

The number of elements in a table $SWt_i$, $i=1, \ldots, 4$ will be referred to as a period of switching. Thus, periods of switching of all four switching tables (99-102) are equal to 11. We used notation $SWt_i$, $i=1, \ldots, 4$ for switching tables different from notation Dsw used in section "Filters with switchers I" presented above. This was done to emphasize the difference between two methods of organizing filters with switching.

In an embodiment of the present invention different switching tables may have different periods of switching and switching tables may contain repeated elements.

A decryption procedure for the scheme with filters with switching II is similar to the decryption procedure with filters I presented above. However, the switching tables should be used in order to apply the corresponding elements of the corresponding filters to the transformations of the degrees specified by the switching tables.

Again, updating procedure of all bit strings should be performed with firm execution of the filters condition II for all stages of computation of various elements of transformations of all degrees.

In general, the greater period of switching and the more filters with switching are arranged, the harder to analyze the encryption scheme.

We may say that two ciphers have different inner structures if they have different either Dfl, Sfl, Dsw, Ssw, or SWt tables, or different collections of the tables, or the iterated transformations realized in the ciphers have different degrees, or the ciphers have different numbers of bit strings. We may also say that two ciphers with iterated transformations of the same degrees and the same numbers of bit strings have different inner structures if the bit strings are related to transformations of different degrees.

14. Applying a Changing Indices Procedure

In an embodiment of the present invention applying a changing indices procedure to the Orange cipher with filters and with filters with switchers may be presented. Applying the changing indices procedure in the Orange cipher, in general allows speeding up both—software and hardware implementations of computing transformations of various degrees. On the other hand, applying the changing indices procedure leads to further deterioration of the analysis of possibilities to attack the cipher, as transformations of different degrees should be analyzed "individually" and, therefore, no general scheme of analysis will be possible to apply to all transformations.

If the changing indices procedure is applied, then vectors (14), that is, vectors $$ADF, ADS, ADT, ADL, ADV, \ldots, ADF^{d(*)}, ADS^{d(*)}, ADT^{d(*)}, ADL^{d(*)},$$

containing, respectively, $$b_1, b_2, b_3, b_4, b_5, b_6, \ldots, b_1^{d(*)}, b_2^{d(*)}, b_3^{d(*)}, b_4^{d(*)}, b_5^{d(*)}$$

polynomials of degrees less than n may be specified.

When vectors (14) are specified the expressions for calculating elements of collections $CUR, \ldots, CUR^{d(*)}$, $d \geq 2$ should be modified in accordance with the procedure presented in "Changing indices" section of the present invention. The main steps of the encryption procedure—a key processing, the first and the second stages of the generation of a ciphertext of a message M, are not changed.

If the changing indices procedure is applied during encrypting a message, the corresponding modifications (with specified vectors (14)) should also be applied for calculating elements of collections $CUR^{d(*)}$, $CUR^{d(*)-1}, \ldots, CUR$, $d \geq 2$ during decrypting a ciphertext. In particular, expressions (78-81) and those without numeration may be modified and the modification depends on the specified vectors (14), while the whole process of decryption is not changed.

G. Parameterization of the Orange Cipher

In an embodiment of the present invention the process of parameterization of the described above cipher may be presented. The aim of the parameterization is to generate a wide class of the ciphers with different properties. There are a few possibilities to parameterize a cipher.

1. Parameterization of the Speed of the Cipher

In an embodiment of the present invention parameterization of the speed of the cipher may be achieved by choosing splitting with jumping and defining mappings $\phi$ with the larger jumping bit distance (see the section "Splitting with jumping I, II"). Maximum speed of a cipher will be in the case of splitting with maximum jumping.

2. Parameterization of Security of the Cipher

In an embodiment of the present invention it is possible to point out a few possibilities of increasing security of the cipher.

i) Security of both—ciphers without and with filters may be increased by increasing a degree of the iterated transformation. A cipher, which is based on the iterated transformation of degree, say 10 is more secure than a cipher that is based on the iterated transformation of degree 5.

ii) Security of both—ciphers without and with filters may be increased by increasing a degree of splitting with jumping n, which, in turn leads to increasing a size of a key K.

iii) Security of a cipher with filters may be increased by increasing the number of bit strings and increasing the number of filters. In general, it is preferable to prepare one bit string for each transformation of different degrees, than to prepare a few bit strings for a transformation of one degree.

iv) Security of a cipher with filters may be increased by increasing the lengths of prepared bit strings that are used as filters.

v) Security of a cipher with filters with switchers may be increased by increasing the number of filters with switching.

vi) Security of a cipher with filters with switchers may be increased by increasing a period of switching.

vii) Security of a cipher with filters and a cipher with filters with switchers may be increased by applying the changing indices procedure.

It may be emphasized that presented above steps ii, iv, vi do not lead to rapid increase in consumed memory. At the same time all steps i-vi practically do not reduce the speed of the algorithm in a case of hardware, or software implementations with large number of independent processors. In the case of software implementation with a few processors steps ii, iv, vi do not lead to rapid decrease in the speed of the algorithm and steps iv and vi do not lead to rapid increase in consumed memory. In general, step vii may lead to increasing the speed of both—software and hardware implementations of a cipher.

H. Customization of the Orange Cipher

In an embodiment of the present invention a method of generating the ciphers by changing their inner structures and parameters of initial values (IV) is presented. This procedure is referenced as customization of the ciphers. There is a fundamental difference between the procedures of parameterization and customization of the ciphers. Parameterization is the procedure of varying the security, the speed, or the memory consumption of the cipher algorithm, while customization is the procedure of generating ciphers with different inner structures or different parameters of IV while keeping approximately the same level of security, speed, memory consumption, etc. In an embodiment of the present invention varying methods of performing customization may be achieved.

1. Varying Vectors $V_0, L_0, L^*_0, \ldots, L_0^{d(*)}$

Varying the vectors (using just $Ran(2^n)$ collections) it is possible to generate $((2^n)!)^{d+2}$ ciphers with different parameters of IV. For example, for n=5 and d=6 it may be possible to generate $(32!)^8$ ciphers with different collections of vectors $V_0, L_0, L^*_0, \ldots, L_0^{d(*)}$.

2. Varying Generators and Irreducible Polynomials of Degree n

For any chosen n there are $\phi(2^n-1)$ generators of a cycle group $GF^*(2^n)$. For example, for n=5 there are 30 generators of $GF^*(2^5)$. Thus, there are a lot of possibilities to use different generators in transformations of different degrees. Besides, it is possible to use different irreducible polynomial of degree n, modulo of which the corresponding cyclic groups are generated.

3. Varying Isomorphisms of Vector Spaces

Varying isomorphisms $\phi_i$ and $\phi_j$, where $i=f, f^*, \ldots, f^{d(*)}$ and $j=g, g^*, \ldots, g^{d(*)}$ it is possible additionally to increase the number of the ciphers with different structures.

4. Varying Distribution of Bit Strings Between Transformations of Various Degrees Assume that a degree of the iterated transformation of a cipher is d and assume, further, that m bit strings, where $d \geq m$ are prepared for some of the transformations. It is possible to consider $\binom{d+1}{m}$ possible combinations of distributing the bit strings between transformations of different degrees. This leads to changing the inner structure of the corresponding cipher.

5. Varying Tables of Filters

By varying Dfl and Sfl tables it is possible to change the inner structure of a cipher.

6. Varying Switching Tables

Varying Dsw, Ssw and SWt tables leads further to changing the inner structure of a cipher.

7. Varying Mappings $\alpha_i$ and Tables $\Delta_i$ During Updating Bit String Procedures Varying mappings $\alpha_i$ and tables $\Delta_i$ using the procedure presented in section "Forming the bit strings I" above and varying tables $\Delta_i$ using the procedure presented in section "Forming the bit strings II" above gives a lot of possibilities to generate different ciphers with filters and ciphers with filters and switchers.

8. Varying Vectors of the Changing Indices Procedure

Varying the content (that is, the polynomials of the corresponding degrees) of the vectors of the changing indices procedure and the sizes of the vectors allows additionally diverting constructions of a cipher.

We will refer the changeable parameters presented in 1-7 above to as the customization parameters.

In an embodiment of the present invention by varying the customization parameters it may be possible to generate practically unlimited number of the Orange ciphers with different IV parameters, or different inner structures.

J. Motivations and Elements of Analysis

In an embodiment of the present invention the analysis of security and motivations of various constructions of the Orange cipher is presented. The elements of analysis reflect "security engine" of the Orange cipher, while motivations explain importance of various elements of the cipher.

It may be stressed that all three types of the Orange cipher, namely, the Orange cipher without filters, the Orange cipher with filters and the Orange cipher with filters with switching are stream based construction in both encryption and decryption. Moreover, the speeds of encryption and decryption procedures are practically the same, as main calculations (transformations of various degrees) in both cases are the same (just two terms are switched). The complexities of both encryption and decryption are practically the same.

1. Motivations for Orange Cipher without Filters

It may be possible to start analyzing, firstly, a cipher without filters. In accordance with presented above encryption scheme a ciphertext of a message M is a sequence of bits $$CUR_1^{d(*)} \| CUR_2^{d(*)} \| \ldots \| CUR_i^{d(*)} \| CUR_{T_1}^{d(*)} \| \ldots \| CUR_{T_p}^{d(*)} \| s_1 \| LB, \quad (103)$$

where $s_1$ is a sequence consisting of s bits 1, s=NBC mod 8, $0 \leq s < 8$ and NBC is a number of bits of a sequence $$CUR_1^{d(*)} \| CUR_2^{d(*)} \| \ldots \| CUR_i^{d(*)} \| CUR_{T_1}^{d(*)} \| \ldots \| CUR_{T_p}^{d(*)}. \quad (104)$$

As a key K was processed before the first element of a ciphertext $CUR_1^{d(*)}$ was generated, it means that all elements $$W_1, W_2, \ldots, W_v \quad (105)$$
$$CURR_1, CURR_2, \ldots, CURR_v,$$
$$CURR_1^*, CURR_2^*, \ldots, CURR_v^*,$$
$$\ldots$$
$$CURR_1^{d(*)}, CURR_2^{d(*)}, \ldots, CURR_v^{d(*)}$$

are not known to an adversary. It may be possible to emphasize, that during processing a key K, collections $$L_i, V_i, L^*_i, \ldots, L_i^{d(*)}, \quad (106)$$

where i=1, ..., v are also generated in accordance with the iterated transformation procedure presented above. As the size of a key is at least $n2^n$ for a splitting degree n it means that, firstly, all elements of $V_v$ will be replaced by the corresponding integers extracted from a key K, secondly, all elements of collections $L_l, L^*_l, \ldots, L_v^{d(*)}$ will be also replaced by the elements of the transformations of the corresponding degrees. The size of a key $n2^n$ guarantees that all elements of initial collections $L_0, V_0, L^*_0, \ldots, L_0^{d(*)}$ will be replaced when elements (105) are generated.

The circumstance is exactly the motivation for establishing the presented above relation between a degree of a splitting with jumping and the size of a key K. Indeed, size $n2^n$ of any chosen key K is a minimal size that guarantees that all elements of $V_0$ will be replaced by the corresponding integers extracted from a key in the result of applying a splitting with jumping procedure and therefore all initial elements of collections $L_0, V_0, L^*_0, \ldots, L_0^{d(*)}$ will be replaced by the corresponding elements computed during processing a key K. In other words, thanks to the choice of the size of a key, an adversary should not expect that some elements of initial collections $L_0, V_0, L^*_0, \ldots, L_0^{d(*)}$ will not be replaced after processing a key K. Thus, if an adversary does not know a key K, then the adversary does not know elements (105) and (106).

To attack a key K using a brute force an adversary has to try $2^n$ n-bit words. Thus, for n=5 an adversary has to consider possible variants of 32 words 5-bit each in order to guess $V_0$.

On the other hand, based on $CUR_1^{d(*)}$ an adversary needs to find a way to compute step by step elements $CUR_1^{d(*)-1}$, $CUR_1^{d(*)-2}, \ldots, CUR_1$ and eventually $M_1$.

Consider expression for $CUR_1^{d(*)}$. In accordance with the iterated transformation procedure we have $$CUR_1^{d(*)} = CUR_1^{d(*)-1} \oplus$$
$$\oplus \phi_f^{d(*)}(\delta^{(int(CURR_f^{d(*)-1}) + L_f^{d(*)}(int(CURR_f^{d(*)-1}), 2^n)) \bmod 2^n}) \oplus$$
$$\oplus \phi_g^{d(*)}(\beta^{(int(CURR_f^{d(*)}) + L_f^{d(*)-1}(int(CURR_f^{d(*)}), 2^n)) \bmod 2^n}), \quad (107)$$

from which it is possible to obtain $CUR_1^{d(*)-1}$ by $$CUR_1^{d(*)-1} = CUR_1^{d(*)} \oplus$$
$$\oplus \phi_f^{d(*)}(\delta^{(int(CURR_f^{d(*)-1}) + L_f^{d(*)}(int(CURR_f^{d(*)-1}), 2^n)) \bmod 2^n}) \oplus$$
$$\oplus \phi_g^{d(*)}(\beta^{(int(CURR_f^{d(*)}) + L_f^{d(*)-1}(int(CURR_f^{d(*)}), 2^n)) \bmod 2^n}). \quad (108)$$

However an adversary does not know elements $CURR_f^{d(*)}$, $CURR_f^{d(*)-1}$ and collections $L_f^{d(*)}$ and $L_f^{d(*)-1}$. This why terms $$\phi_f^{d(*)}(\delta^{(int(CURR_f^{d(*)-1}) + L_f^{d(*)}(int(CURR_f^{d(*)-1}), 2^n)) \bmod 2^n}) \quad (109)$$

and $$\phi_g^{d(*)}(\beta^{(int(CURR_f^{d(*)}) + L_f^{d(*)-1}(int(CURR_f^{d(*)}), 2^n)) \bmod 2^n}) \quad (110)$$

cannot be computed by an adversary. Applying a brute force in order to "check" various combinations of unknown elements (n-bit words) in terms (109) and (110) an adversary needs to consider $x_1$ n-bit words, where $2^{2n} \leq x_1 \leq 2^{4n}$ order to complete the search.

Next, considering $$CUR_1^{d(*)-2} = CUR_1^{d(*)-1} \oplus$$
$$\oplus \phi_f^{d(*)-1}(\delta^{(int(CURR_f^{d(*)-2}) + L_f^{d(*)-1}(int(CURR_f^{d(*)-2}), 2^n)) \bmod 2^n}) \oplus$$
$$\oplus \phi_g^{d(*)-1}(\beta^{(int(CURR_f^{d(*)-1}) + L_f^{d(*)-2}(int(CURR_f^{d(*)-1}), 2^n)) \bmod 2^n})$$

an adversary needs additionally check $x_2$ n-bit words, where $2^{2n} \leq x_2 \leq 2^{3n}$ for checking all the possibilities for $CURR_f^{d(*)-2}$, $L_f^{d(*)-1}(int(CURR_f^{d(*)-2}))$ and $L_f^{d(*)-2}(int(CURR_f^{d(*)-1}))$ for each variant from a collection containing $x_1$ possibilities.

2. Motivations for Orange Cipher with Filters

The security of the Orange cipher with filters is sufficiently increased even for relatively small degrees of the iterated transformations.

Firstly, it is important to note that during processing a key K a collection of bit strings is updated based on a collection of elements (105) and the bit strings are involved into the computation of elements (105). Considering, for instance, Example I and taking into account that the sizes of all the bit strings are 200 bits, 32 bits of bit string $\epsilon^{**}$ will be flipped (from 0 to 1) and totally 32 bits in both bit strings $\epsilon_1^{4(*)}$ and $\epsilon_2^{4(*)}$ will be also flipped after the key processing is completed.

Moreover, as filters are set up from the beginning of processing a key K, a collection of elements (105) in the case of the iterated transformation with filters may differ from the same collection (105) obtained by applying an iterated transformation without filters.

Considering a Ciphertext $$CUR_1^{d(*)} \| CUR_2^{d(*)} \| \ldots \| CUR_i^{d(*)} \| CUR_{T_1}^{d(*)} \| \ldots \| CUR_{T_p}^{d(*)} \| s_1 \| LB$$

of a message M and starting from $CUR_1^{d(*)}$ an adversary needs step by step to compute elements $CUR_1^{d(*)-1}$, $CUR_1^{d(*)-2}, \ldots, CUR_1$ and eventually $M_1$. However, an adversary cannot use expressions (109) and (110) trying to "guess" elements $CURR_f^{d(*)}$, $CURR_f^{d(*)-1}$ and $L_f^{d(*)}(int(CURR_f^{d(*)-1}))$, $L_f^{d(*)-1}(int(CURR_f^{d(*)}))$ as the elements are calculated with involvement of elements of set up filters, that is, the corresponding parts of the bit strings. Therefore, considering various possibilities for the corresponding parts of the filters, an adversary every time has to recompute the whole chain of elements $CUR_1^{d(*)-1}, CUR_1^{d(*)-2}, \ldots, CUR_1$ depending on a Dfl table. Furthermore, with the calculation of new variants of $CUR_1^{d(*)-1}$, $CUR_1^{d(*)-2}$, ..., $CUR_1$ new variants of updating the bit strings are arisen. An adversary does not know a key K and, therefore an adversary does not know the modifications (in general, the number of flipped bits is at least $2^n$) that changed the bit strings after processing a key K. Therefore, in turn, an adversary facing a challenge to "guess" at least $2^n$ updates per bit string of all prepared bit strings.

It is necessary also to stress that in accordance with the forming bit strings I and forming bit strings II procedures presented above, changing one position of updating one bit strings leads to changing all positions in all bit strings starting from the moment of changing the updating. As the sizes of bit strings may be up to a few hundred bits, and, in general, the number of bit strings may be equal up to $2^n(d+1)$, any new variant for any update of any bit string may also potentially influence updates of elements of collections (105) (and collections (106)). Therefore any attempt to track all possible variants for computing the whole chain of elements $$CUR_1^{d(*)-1}, CUR_1^{d(*)-2}, \ldots, CUR_1 \qquad (111)$$

becomes extremely difficult. Using iterated transformations with filters with switchers leads to worsening the possibility for the tracking.

K. Constructing the Orange Stream Cipher Based on the ERINDALE-PLUS Hashing Function In an embodiment of the present invention a method of transforming the ERINDALE-PLUS hashing algorithm into a stream cipher is presented. The presented below transformation of the ERINDALE-PLUS hashing function allows using it as a hashing function and a cipher and a secure hashing function when a key is involved into a computation.

U.S. patent application Ser. No. 13/057,030 disclosed, in particular, the ERINDALE-PLUS hashing method consisting of a splitting with jumping procedure, an iterated masking procedure, a bit string forming procedure, a padding procedure and forming the final hash value procedure.

It may be presented how with minor modification of some of the procedures of the ERINDALE-PLUS hashing function and the process of generating a hash value the function may be transformed into an Orange-like stream cipher. Moreover, the modified hashing function may be used for simultaneous generation of a secure hash value of a message, and a ciphertext of a message.

The type of a stream cipher that it is possible to obtain modifying the ERINDALE-PLUS hashing function depends on a type of an iterated transformation that replacing an iterated masking procedure of the ERINDALE-PLUS hashing function.

In an embodiment of the present invention the method of applying various iterated transformation procedures instead of iterated masking procedure used in the ERINDALE-PLUS hashing function in order to have possibilities to realize various types of ciphers is presented. Instead of iterated masking procedure in the ERINDALE-PLUS hashing function it may be possible to use the following iterated transformation:
  a) The iterated transformations procedure presented above, in section "Iterated transformations" of the present invention;
  b) The iterated transformations with filters I,
  c) The iterated transformations with filters II,
  d) The iterated transformations with filters III,
  e) The iterated transformations with filters with switchers I,
  f) The iterated transformations with filters with switchers II.

Thus, by applying iterated transformations b)-f) presented above instead of an iterated masking procedure in the ERINDALE-PLUS hashing function it may be possible to realize the corresponding scheme of encryption with filters and with filters with switchers, while by applying iterated transformation a) a scheme of encryption without filters may be realized. Iterated transformations b)-f) may be applied in accordance with specified Dfl or Sfl tables, while transformations with filters with switchers may be applied in accordance with presented Dsw, Ssw and SWt tables. Moreover, tables Dfl and/or Sfl and switching tables Dsw, Ssw and SWt become a part of IV of the ERINDALE-PLUS hashing function. It is also very important to apply the presented above filters updating condition I and Sfl-condition during updating bit strings that are used as filters for generating a ciphertext. On the other hand the presented above filters updating condition II and Sfl-condition should be used during updating bit strings that are used as filters for decrypting a ciphertext.

In an embodiment of the present invention additionally modifications of the following main procedures of the ERINDALE-PLUS hashing function may be applied:
  i) Two procedures of splitting with jumping described in the present invention above may be additionally applied in the ERINDALE-PLUS hashing function for realizing splitting with jumping;
  ii) Two procedures of forming bit strings described in the present invention may be additionally used in the modified ERINDALE-PLUS hashing function for forming bit strings;
  iii) A procedure of forming a padding sequence BS presented above in the invention may be applied as a padding procedure of the modified ERINDALE-PLUS hashing function.

Thus, described in the present invention two splitting with jumping procedures do not replace the splitting with jumping procedures used in the ERINDALE-PLUS hashing algorithm. It may be noted that the splitting with jumping procedures presented in U.S. patent application Ser. No. 13/057,030 may also be applied in the modified ERINDALE-PLUS hashing function.

The same takes place for forming bit strings procedures described in the present invention above. It may be noted that the forming bit strings procedures presented in U.S. patent application Ser. No. 13/057,030 may also be applied in the modified ERINDALE-PLUS hashing function.

At the same time a final hash value generation procedure presented in U.S. patent application Ser. No. 13/057,030 remains unchanged.

Next, the process of computing a secure hash value may be started with processing a key K, the size of which should be related to the chosen degree of splitting n in accordance with the presented above rule. By processing a key before processing a message and performing all procedures of hashing, a secure hash value of the message may be generated. In fact, it is a new method of generating a secure hash value of a message.

A ciphertext of a message may be generated by the modified ERINDALE-PLUS hashing function in accordance with the procedures described in sections "The Orange family of stream ciphers without filters" and "The Orange family of stream ciphers with filters". It means that elements of the transformation of the highest degree generated during the first and the second stage of processing a key, a message and a padding sequence of bits form a ciphertext of a degree message.

In an embodiment of the present invention the presented above modification of the ERINDALE-PLUS hashing function allows realizing simultaneous generation of both a secure hash value and a ciphertext of a message. Moreover, the simultaneous generation of both a secure hash value and a ciphertext of a message may be realized without reducing the speed of the hashing function and without involving any additional memory. To generate both a secure hash function and a ciphertext of a message it is necessary to save the elements of the transformation of the highest degree generated during the second and the third stages of computing a secure hash value. To create a file based on the collection of the generated elements it may be necessary to form s-bit word consisting of 1 and 16-bit word LB (see section "Encryption without filters").

It is important also to note that when no key is used and a message is processed by the ERINDALE-PLUS hashing function with the applied above modifications, a hash value of a message may be generated.

To decrypt a message a separate decryption block may be constructed and embedded into the ERINDALE-PLUS hashing function, as it may not be possible to use the ERINDALE-PLUS hashing algorithm with the modifications presented above for decryption. On the other hand the decryption block may be naturally and easily constructed based on the implemented iterated transformation, as the decryption procedure differs just in rearranging of two terms (see, for instance (39)-(42), or (79)-(81)) in comparing with encryption (or hashing) procedure.

Furthermore, with the presented above modifications of the ERINDALE-PLUS hashing function, not just forward, but also partial backward processing may be used for encrypting a message. In this case it is necessary just to invert block by block the decrypted plaintext.

It may be noted that in accordance with presented above, in sections "Parameterization of the Orange cipher" and "Customization of the Orange cipher" it may be possible to construct practically unlimited numbers of ciphers with different IV and different inners structures. Therefore it is possible to construct practically unlimited Orange stream ciphers (without filters, with filters and with filters with switching) based on the modified ERINDALE-PLUS hashing function and, of course unlimited number of the ERINDALE-PLUS hashing functions with different IV and inner structures.

It may be also noted that in general there is no need to apply the presented above modifications to the part of the function, which is not involved in the encryption procedure. In other words, if a direct (or partial backward) processing of a message is used for generation of a ciphertext of a message, there is no need to apply the presented above modifications to the partial backward (or direct) processing of a message.

L. Implementation and Performance

As it was presented above any implementation of the ERINDALE-PLUS hashing function with minor modifications may be transformed into an Orange stream cipher. Therefore performance of the stream cipher may be evaluated by the performance of the ERINDALE-PLUS hashing algorithm.

As both data paths and control paths of the Orange cipher are short (especially when a degree of splitting with jumping n is 4, 5 or 6) it may be possible to use a high frequency in both FPGA and ASIC. Preliminary estimation shows that ASIC implementation of the ERINDALE-PLUS hashing function can give speed from 20 to 50+ Gbps.

As the structure of the Orange stream cipher, in general, is simpler than the one of the ERINDALE-PLUS hashing function (a padding procedure of the Orange cipher is more simple, the Orange cipher does not have any backward processing and a final hash value generation procedure) the hardware implementation of the Orange cipher may be realized even more effectively and faster than a hardware implementation of the ERINDALE-PLUS hashing function.

The speed of a software implementation of the Orange cipher realized on a computer with one processor is close to the speed of SHA 2 family of hash functions. However the speed of the software implementation on a computer with more than one processor may be much higher, as a transformation of each degree may be processed independently and in a parallel way using a separate processor for each transformation. Thus, a software implementation of the Orange cipher with the iterated transformation, for instance, of degree 5 may be very effectively realized on a computer with 4-6 processors. A software implementation of the Orange cipher may be especially effective in servers with many processors.

Embodiments of the present invention may be represented as a software product stored in a machine readable medium (also referred to as a computer-readable medium, a processor-readable medium, or a computer usable medium having a computer readable program code embodied therein). The machine readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the present invention.

Those of ordinary skill in the art will appreciate that other instructions and operations necessary to implement the described invention may also be stored on the machine-readable medium. Software running from the machine readable medium may interface with circuitry to perform the described tasks.

The invention claimed is:
1. A system directed at stream ciphers capable of encrypting and decrypting data characterized in that it comprises:
   a) at least one computer;
   b) providing a message stored on at least one computer;
   c) a stream cipher system being operable by the at least one computer for application to a key, the message presented in a form of a stream of n-bit words and a collection of initial values to produce a ciphertext, comprising the following elements:
      i) an iterated transformations procedure that allows widening a class of CUR construction by changing indices of terms for calculation of the elements of CUR of various degrees;
      ii) a bit strings generation procedure having clustering; and
      iii) a padding procedure.
2. The system of claim 1, characterized in that the stream cipher incorporates an Orange stream cipher.
3. The system of claim 1, characterized in that the stream cipher incorporates a modified ERINDALE-PLUS hashing function having an input message as a flow of n-bit words comprising an iterated transformations procedure, a forming bit string procedure, a padding procedure and a changing indices procedure such that based on a key and a message the function capable simultaneously generating both a ciphertext and a keyed hash value of a message.

4. The system of claim 1, wherein an implementation of the stream cipher is chosen from the group consisting of hardware and software.

5. The system of claim 1, characterized in that the iterated transformations procedure is based on parameters obtained from a collection of initial values, and wherein the iterated transformations procedure is chosen from the group consisting of iterated transformations procedure, iterated transformations with filters I, iterated transformations with filters II, iterated transformations with filters III, iterated transformations with filters with switchers I and iterated transformations with filters with switchers II.

6. The system of claim 1, further comprising a changing indices procedure wherein the changing indices procedure is applied to the iterated transformations procedure.

7. The system of claim 1, characterized in that the number of the generated bit strings is based on a parameter obtained from a collection of initial values, wherein the bit strings generation procedure having clustering for each bit string is chosen from the group consisting of bit strings generating procedure I and bit strings generating procedure II, and wherein the clustering is a part of a collection of initial values.

8. The system of claim 1, wherein the stream cipher further comprises characteristics of speed, security and used memory which are parameterized.

9. The system of claim 1, wherein a customization procedure is applied to the stream cipher, which allows constructing the stream cipher in accordance with chosen collections of customization parameters.

10. The system of claim 1, characterized in that the degree of a splitting with jumping determines the range of the sizes of a key.

11. The system of claim 1, characterized in that the stream cipher incorporates a modified ERINDALE-PLUS hashing function that based on a key and a message capable simultaneously generating both a ciphertext and a keyed hash value of a message; said modification of the ERINDALE-PLUS hashing function having an input message as a flow of n-bit words comprising, an iterated transformations procedure, a forming bit strings procedure having clustering, a padding procedure; said iterated transformations procedure incorporates changing indices procedure.

12. The system of claim 1 further comprising a decipher system that based on a collection of initial values and a key capable to decrypt a ciphertext to produce a plaintext.

13. A computer implemented method of encrypting a message characterized in that it is comprises the following steps:
   i) applying to a key, a message and a collection of initial values and an iterated transformations procedure to a message presented in a form of a stream of n-bit words to generate transformation outputs of various degrees and a ciphertext, said iterated transformations procedure chosen from the group consisting of iterated transformations procedure, iterated transformations with filters I, iterated transformations with filters II, iterated transformations with filters III, iterated transformation with filters with switchers I and iterated transformations with filters with switchers II;
   ii) applying a bit strings generation procedure having clustering to the message presented in a form of a stream of n-bit words and to transformations outputs of various degrees to generate bit strings outputs, said bit strings outputs are generated by a procedure chosen from the group consisting of bit strings generating procedure I and bit strings generating procedure II wherein the clustering is a part of a collection of initial values;
   iii) generating padding output by applying a padding procedure to the bit strings outputs;
   iv) processing the padding outputs to generate a ciphertext by applying a procedure comprising splitting with jumping procedure, an iterated transformations procedure and a bit strings generation procedure having clustering.

14. The method of claim 13, characterized in that the stream cipher incorporates an Orange stream cipher.

15. The method of claim 13, characterized in that the speed, security and consumed memory of the stream cipher are parameterized.

16. The method of claim 13, characterized in that the degree of a splitting with jumping determines the range of the sizes of a key.

17. The method of claim 13, wherein a changing indices procedure is applied to the iterated transformations procedure.

18. The method of claim 13, wherein a customization procedure is applied to the stream cipher; said customization procedure allows constructing the stream ciphers in accordance with chosen customization parameters.

19. A method of use for encryption and decryption of a message, the method comprising:
   a) applying a stream cipher to a key, a collection of initial value and a message to produce a ciphertext output utilizing the following elements:
      i) a splitting with jumping procedure
      ii) an iterated transformations procedure;
      iii) a bit strings generating procedure having clustering;
      iv) a padding procedure;
   b) applying a decipher to a key, a collection of initial values and a ciphertext to produce a plaintext.

* * * * *